US007961902B2

(12) United States Patent
Horigome et al.

(10) Patent No.: US 7,961,902 B2
(45) Date of Patent: Jun. 14, 2011

(54) SPEAKER APPARATUS AND MANUFACTURING METHOD THEREOF

(75) Inventors: Minoru Horigome, Yamagata (JP); Hiroyuki Kobayashi, Yamagata (JP)

(73) Assignees: Pioneer Corporation, Tokyo (JP); Tohoku Pioneer Corporation, Tendo-shi, Yamagata (JP)

(*) Notice: Subject to any disclaimer, the term of this patent is extended or adjusted under 35 U.S.C. 154(b) by 1187 days.

(21) Appl. No.: 11/439,428

(22) Filed: May 24, 2006

(65) Prior Publication Data

US 2006/0274914 A1 Dec. 7, 2006

(30) Foreign Application Priority Data

May 25, 2005 (JP) ............................... P2005-152929
May 27, 2005 (JP) ............................... P2005-156098
May 31, 2005 (JP) ............................... P2005-159558
Jun. 8, 2005 (JP) ............................... P2005-168600
Jun. 8, 2005 (JP) ............................... P2005-168656

(51) Int. Cl.
*H04R 1/00* (2006.01)
*H04R 9/06* (2006.01)
*H04R 11/02* (2006.01)
*H02K 41/02* (2006.01)

(52) U.S. Cl. ...... 381/421; 381/403; 381/419; 310/12.24

(58) Field of Classification Search .................. 381/396, 381/398, 400, 412, 420, 421, 432, 433; 310/12.01, 310/12.24–12.26
See application file for complete search history.

(56) References Cited

U.S. PATENT DOCUMENTS 6,095,280 A * 8/2000 Proni ............................ 381/432
2003/0185415 A1* 10/2003 Funahashi et al. ............ 381/423
2004/0086150 A1* 5/2004 Stiles ............................ 381/412
2005/0190945 A1* 9/2005 Calderwood et al. ......... 381/421
2006/0251286 A1* 11/2006 Stiles ............................ 381/421
2008/0240488 A1* 10/2008 Funahashi et al. ............ 381/423

FOREIGN PATENT DOCUMENTS

JP 63-155900 6/1988
JP 7-5199 1/1995
JP 11-262085 9/1999
JP 2000-308174 11/2000
JP 2001-157290 6/2001
JP 2001-320796 11/2001
JP 2004-007331 1/2004
JP 2004-032659 1/2004

* cited by examiner

*Primary Examiner* — Curtis Kuntz
*Assistant Examiner* — Jesse A Elbin
(74) *Attorney, Agent, or Firm* — Drinker Biddle & Reath LLP

(57) ABSTRACT

A speaker apparatus comprises: a drive cone transferring a drive power of a voice coil to the diaphragm; a diaphragm disposed in a driving direction; and a diaphragm disposed in a driving direction. The drive cone is fixed to a diaphragm support of a frame. An outer circumference of the diaphragm is fixed to the diaphragm support of the frame. An outer circumference of the diaphragm is fixed to the diaphragm support of the frame. The diaphragm, the drive cone and the frame surround a sealed space where the diaphragm and the drive cone are connected through a non-ring-shaped connection piece. A vibration system is supported through a voice coil bobbin by a spring property of air contained in the sealed space.

5 Claims, 22 Drawing Sheets

FOURTH EMBODIMENT

FRIST
EMBODIMENT

SECOND
EMBODIMENT

THIRD
EMBODIMENT

FOURTH
EMBODIMENT

FIFTH
EMBODIMENT

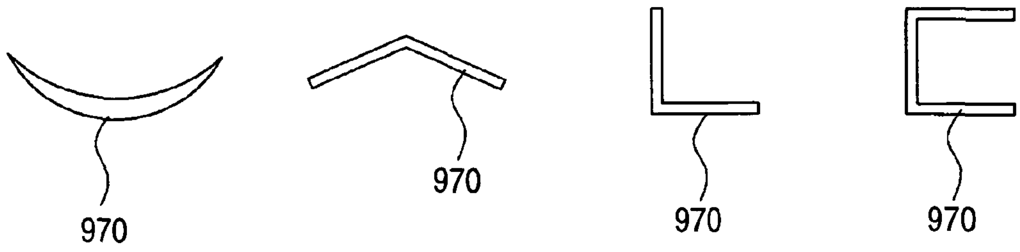
FIG. 14A FIG. 14B FIG. 14C FIG. 14D
FIG. 15
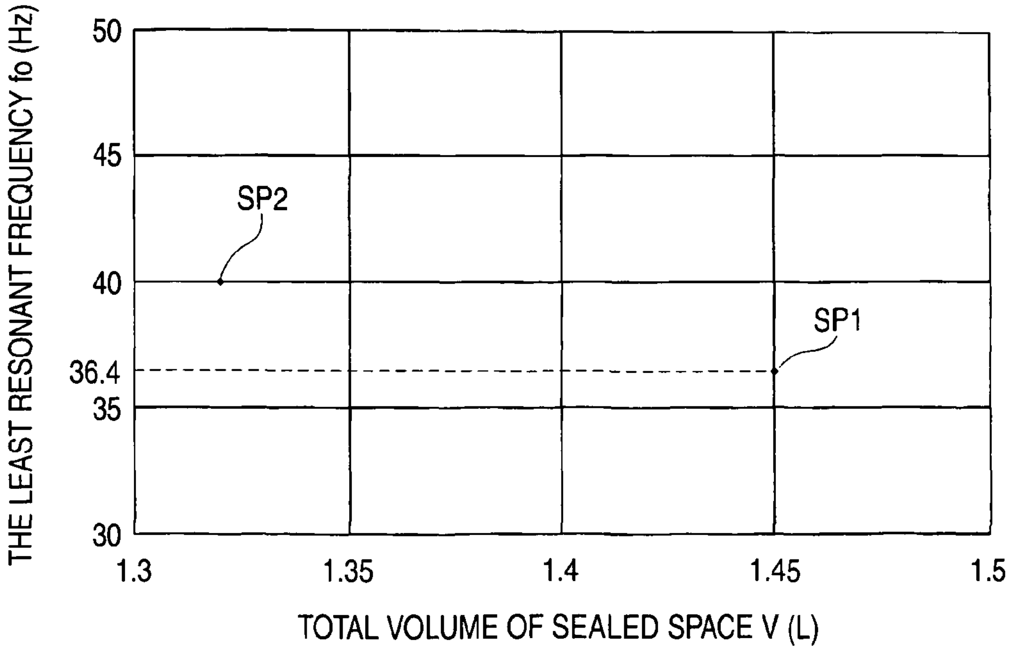

SIXTH
EMBODIMENT

*SEVENTH EMBODIMENT*

SPEAKER APPARATUS AND MANUFACTURING METHOD THEREOF

CROSS-REFERENCE TO RELATED APPLICATIONS

This application is based on and claims the benefit of priority from the prior Japanese Patent Applications No. 2005-168656, filed on Jun. 8, 2005, No. 2005-168600, filed on Jun. 8, 2005, No. 2005-156098, filed on May 27, 2005, No. 2005-152929, filed on May 25, 2005, and No. 2005-159558, filed on May 31, 2005; the entire contents of which are incorporated herein by reference.

TECHNICAL FIELD

The present invention relates to a speaker apparatus and a manufacturing method thereof.

BACKGROUND

FIGS. 1A and 1B are diagrams illustrating a configuration of a related-art speaker apparatus.

The speaker apparatus 100 includes a diaphragm 103, a drive cone 105 which is disposed in back of the diaphragm 103 to be concentric with the diaphragm 103 and of which the inner circumference is air-tightly attached integrally to the inner circumference of the diaphragm 103, a frame 107 in which diaphragm supports 107*a* and 107*b* for supporting the outer circumferences of the diaphragm 103 and the drive cone 105 are fitted to the front end thereof and in which a magnetic circuit 109 is fitted to the central axis of the rear end thereof, and a voice coil 113 which is wound on a voice coil bobbin 111 bonded integrally to the inner circumference of the drive cone 105 and which is inserted into a magnetic gap 109*a* of the magnetic circuit 109.

The outer circumference of the diaphragm 103 is fixed to the diaphragm support 107*a* through an edge damper 115 bonded to the outer circumference thereof. The outer circumference of the drive cone 105 is fixed to the diaphragm support 107*b* through an edge damper 117 bonded to the outer circumference thereof.

The diaphragm support 107*b* is a step disposed at a position spaced apart by a proper distance in the axial direction from the diaphragm support 107*a*. An enclosed cylindrical wall not provided with any opening connects the diaphragm support 107*a* and the diaphragm support 107*b* of the frame to each other. The cylindrical wall 107*c* of the frame 107 closes an opening of a space 119 disposed between the diaphragm 103 and the drive cone 105 to form an enclosed space, and a vibration system including the voice coil 113 is supported by a spring property of air contained in the enclosed space 119.

The magnetic circuit 109 includes a yoke 121 in which a cylindrical center pole 121*b* is protruded from the center of a disk-shaped plate 121*a*, a ring-shaped magnet 123 which is inserted into the outer circumference of the center pole 121*b*, and a ring-shaped top plate 125 which is movably inserted into the front end of the center pole 121*b* so that the magnet 123 is inserted between the plate 121*a* and the top plate 125.

The gap between the inner circumference of the top plate 125 and the center pole 121*b* serves as a magnetic gap 109*a* in which the voice coil 113 is disposed.

The frame 107 has a shallow bawl shape and the magnetic circuit 109 is attached to the inner surface of the bottom portion 107*d* in a state that a plate 121*a* of a yoke 121 is placed thereon. That is, the magnetic circuit 109 is disposed between the rear end (bottom portion 107*d*) of the frame 107 and the drive cone 105.

An opening 107*f* as a vent hole for discharging back pressure of the diaphragm is properly formed between the bottom portion 107*d* of the frame 107 and the diaphragm support 107*b*. The rear surface of the diaphragm support 107*a* of the frame 107 serves as a flange surface which is closely fixed to a baffle of a speaker cabinet.

The speaker apparatus 100 is manufactured in the following procedure.

First, the magnetic circuit 109 is attached to the rear portion of the frame 107 and the voice coil 113 is temporarily built therein. Thereafter, the drive cone 105 is fixed to the diaphragm support 107*b* and then the diaphragm 103 is fitted and fixed to the diaphragm support 107*a*. The inner circumference of the diaphragm 103 is bonded and fixed to the inner circumference of the drive cone 105, thereby forming the enclosed space 119. The voice coil bobbin 111 is bonded and fixed to the inner circumference of the drive cone 105.

When the enclosed space 119 is completely formed, it is checked whether air tightness of the enclosed space 119 or a spring property as an air spring is proper. When it is proper, a dust cap 127 is attached and fitted to the center portion of the diaphragm 103, thereby completing the speaker apparatus. The dust cap 127 covers the front side of the voice coil bobbin 111 to prevent dust from invading the magnetic gap 109*a*.

In the speaker apparatus 100, since the spring property as an air spring of the enclosed space 119 between the diaphragm 103 and the drive cone 105 controls vibration of the voice coil bobbin 111, the voice coil 113, the diaphragm 103, and the drive cone 105, it is not necessary to provide a specific damper for control.

Accordingly, the axial size of the speaker apparatus 100 is reduced due to omission of the specific damper and the installation space thereof, and it is thus possible to reduce the thickness of the speaker apparatus, which is required for a car audio system or the like.

Since the drive cone 105 can be made of the same material as the diaphragm 103, the weight is smaller and the mechanical fatigue is less generated, in comparison with the related-art bellows-shaped damper. Accordingly, it is possible to prevent deterioration in damping ability due to the mechanical fatigue of the constituent elements, thereby elongating the life time of the speaker apparatus. In addition, since large deformation is not locally generated, singular vibration or frictional sound making sound quality muddy does not occur. Accordingly, it is possible to reproduce sound with high quality without muddiness.

An electromotive speaker apparatus includes a magnetic circuit, a frame of which the back portion holds the magnetic circuit, a cone-shaped diaphragm of which a roll-shaped edge of the outer circumference is fixed to the front portion of the frame, and a voice coil wound on a cylindrical voice coil bobbin which is axially movable. The voice coil bobbin is elastically supported by the frame through a damper for regulating the axial movement. The damper generally has a bellows shape which is concentric about the voice coil bobbin (JP-A-63-155900 and JP-A-11-262085).

However, in the speaker apparatus of which a vibration system is supported by the damper, the length in the axial direction is large and the stiffness is great, thereby easily causing deterioration in support ability due to mechanical fatigue. As a result, there has been developed a damperless speaker apparatus in which an enclosed space is formed between a pair of diaphragms instead of the damper and the vibration system is supported by the spring property of air in the enclosed space.

FIGS. 12A and 12B illustrate a damperless speaker apparatus, where FIG. 12A is a longitudinal sectional view and FIG. 12B is a plan view of the speaker apparatus as seen from the front side.

The speaker apparatus includes a magnetic circuit 833 having a magnet 853, a frame 835 housing the magnetic circuit 833, a cylindrical voice coil bobbin 845 which is axially movable with respect to the magnetic circuit 833, a voice coil 846 wound on the voice coil bobbin 845 to face the magnetic circuit 833, a diaphragm 841 which is spaced axially apart from and concentric with the voice coil bobbin 845 and of which the outer circumference is fixed to the frame 835 and the inner circumference is fixed to the voice coil bobbin 845, and a drive cone 842 for delivering the drive power of the voice coil 846 to the diaphragm 841. A space surrounded with the diaphragm 841, the drive cone 842, and the frame 835 is enclosed air-tightly, and the diaphragm 841 and the drive cone 842 are connected to each other and reinforced by connection members 875 in the enclosed space 867. Reference numeral 823 denotes a dust cap disposed on the front surface of the speaker apparatus.

Thanks to the reinforcement by the connection members 875, the rigidity of the diaphragm 841 and the drive cone 842 is enhanced, thereby accomplishing improvement in propagation speed of acoustic vibration.

FIG. 16 is a diagram illustrating a configuration of a related-art electromotive speaker apparatus 1000, where the speaker apparatus includes a magnetic circuit 1003, a frame 1005 attached to the rear portion of the magnetic circuit 1003, a cone-shaped diaphragm 1009 in which a roll-shaped edge 1007 on the outer circumference thereof is fixed to a diaphragm support 1005*a* in front of the frame 1005, and a voice coil 1012 wound on a cylindrical voice coil bobbin 1011.

The magnetic circuit 1003 includes a yoke 1015 in which a cylindrical center pole 1015*b* is protruded from the center of a disk-shaped plate 1015*a*, a ring-shaped magnet 1016 which is inserted into the outer circumference of the center pole 1015*b*, and a ring-shaped top plate 1017 which is inserted into the front end of the center pole 1015*b* so that the magnet 1016 is inserted between the plate 1015*a* and the top plate 1017.

The gap between the inner circumference of the top plate 1017 and the center pole 1015*b* serves as a magnetic gap 1019 in which the voice coil 1012 is disposed.

An opening 1009*a* through which the voice coil bobbin 1011 is inserted is formed at the center of the diaphragm 1009. The edge 1007 bonded to the outer circumference of the diaphragm 1009 is fixed to the diaphragm support 1005*a* in the state that an attachment flange portion 1007*a* disposed in the edge 1007 is inserted between a ring-shaped gasket 1021 bonded to the diaphragm support 1005*a* and the diaphragm support 1005*a*. The inner circumference 1009*b* of the diaphragm 1009 having the opening 1009*a* is fixed to the voice coil bobbin 1011 inserted through the opening 1009*a* by adhesion.

A dust cap 1023 is disposed at the center of the diaphragm 1009. The dust cap 1023 covers the front side of the voice coil bobbin 1011 to prevent dust from invading a magnetic gap 1019.

The cylindrical voice coil bobbin 1011 is fitted to the outer circumference of the center pole 1015*b* to be axially movable and is elastically supported through a damper 1025 by the frame 1005 so as to regulate the axial movement.

Generally, as the damper 1025, a damper having a bellows structure concentric with the voice coil bobbin 1011 is widely used (for example, see JP-A-63-155900 and JP-A-11-262085).

The outer circumference of the damper 1025 is fixed to a damper support 1005*b* of the frame 1005 and the inner circumference thereof is fixed to the outer circumference of the voice coil bobbin 1011. Accordingly, the damper regulates the radial displacement of the voice coil bobbin 1011 and absorbs vibration energy by deformation of the bellows at the time of driving the diaphragm 1009, thereby controlling the vibration of the diaphragm 1009.

Generally, the frame 1005 has a structure that an opening 1005*c* is properly formed between the diaphragm support 1005*a* and the damper support 1005*b*. The opening 1005*c* serves as a vent hole for discharging back pressure at the time of driving the diaphragm 1009 and contributes to the decrease in weight of the frame 1005.

In the speaker apparatus 1000, when a sound signal is input to the voice coil 1012 through an input terminal and a wire not shown, the voice coil bobbin 1011 reciprocates to vibrate the diaphragm 1009, thereby reproducing sounds.

On the other hand, there has been also known a speaker apparatus having ability of reproducing low-frequency sound by reducing minus stiffness of means for giving the minus stiffness to the vibration system of the speaker apparatus (for example, see JP-A-2000-308174 and JP-A-2001-157290). In this case, by varying the stiffness of the means for giving the minus stiffness to the vibration system of the speaker apparatus, the minus stiffness is controlled, thereby changing the low-frequency characteristic.

SUMMARY

However, in the manufacturing method as shown in FIG. 1A, 1B, a plurality of components such as the magnetic circuit 109 is fitted to the frame 107 and then the diaphragm 103 and the drive cone 105 are individually fitted thereto to complete the enclosed space 119. Accordingly, when a defect in the enclosed space 119 is detected through inspection, the correction work should be performed with a large weight of the frame 107 or the magnetic circuit 109 and it is thus difficult to perform the correction work.

When the defect in the enclosed space 119 is not correctable, the number of components built therein up to that time is large and thus the disuse cost increases. Accordingly, there is a problem that the economical loss is large.

In order to reduce the defective promotion of the enclosed space 119, the machining precision of the diaphragm support 107*a* and 107*b* formed on the frame 107 which is a relatively large component should be improved. Accordingly, since the number of places to be machined with high precision in the large-scaled component increases, there is a problem that the machining cost increases, thereby causing the increase in cost.

Since the outer circumference of the diaphragm 103 and the drive cone 105 are fixed to the frame 107 through the edge dampers 115 and 117 but the fixation between the frame 107 and the edge dampers 115 and 117 is rigid, unnecessary vibration from the magnetic circuit 109 may be delivered to the diaphragm 103 and the drive cone 105 through the frame 107 and the edge dampers 115 and 117, thereby affecting acoustic characteristic.

In order to enhance the drive power of the diaphragm 103 and the drive cone 105 and to further improve performance of a speaker apparatus, the magnetic flux density of the magnetic gap 109*a* may be enhanced.

In order to enhance the magnetic flux density of the magnetic gap 109*a*, the increase in size of the magnet 123 can be considered.

On the other hand, in the speaker apparatus 100, when the drive cone 105 is displaced backwardly, the magnet 123 must be positioned so that the drive cone 105 does not interfere with the cone 123*a* of the magnet 123.

That is, the size of the magnet 123 is set so that the cone 123*a* is located at a position which is withdrawn by a distance s1 from the maximum backward displaced position E1 of the drive cone 105. The positional regulation of the cone 123*a* determines the outer diameter D1. Accordingly, even when an empty space remains around the outer circumference of the magnet 123, there is a problem that the magnet 123 cannot be increased in diameter.

Therefore, a speaker apparatus 602 shown in FIG. 10 has been studied.

Since the speaker apparatus 602 shown in FIG. 10 employs a magnet 624 having a pentagonal section in which the cone close to the drive cone 605 is chamfered, a distance s2 can be secured from the maximum backward displaced position E1 of the drive cone 605 by the tilted chamfered portion 624*a*. The distance s2 is greater than the distance s1 of the magnet 123 having a rectangular section in the speaker apparatus 100 shown in FIG. 1B.

The outer diameter D2 at the rear end can be greater in diameter by a size w2 than that of the magnet 623 having a rectangular section by effectively utilizing the empty space at the rear end of the frame 607. That is, by increasing the outer diameter, it is possible to enhance the magnetic flux density of the magnetic gap 609*a* and thus to improve the speaker performance.

However, since the magnet 624 having a pentagonal section described above has a special shape, there is a problem that it causes large increase in cost.

Since the change in shape or the like of the drive cone 5 requires re-manufacturing of a new magnet 624 in which the tilted angle of the chamfered portion 624*a* is changed, there is a problem that change of model cannot be easily performed.

The speaker apparatus shown in FIG. 1A is symmetric about the center line and thus only a half about the center line is shown.

The speaker apparatus shown in FIG. 1A includes a magnetic circuit 109 having a magnet 123, a frame 107 supporting the magnetic circuit 109, a cylindrical voice coil bobbin 111 disposed to be axially movable with respect to the magnetic circuit 109, a voice coil 113 wound on the voice coil bobbin 111 to face the magnetic circuit 109, a diaphragm 103 disposed in a driving direction, and a drive cone 105 for delivering a drive power of the voice coil 113 to the diaphragm 103. A space surrounded with the diaphragm 41, the drive cone 105, and the frame 107 is an enclosed space, and a vibration system is supported through the voice coil bobbin by a spring property of air in the enclosed space 119. Reference numeral 121 denotes a yoke holding the magnet 123 and reference numeral 127 denotes a dust cap covering the center of the diaphragm 103 at the front side of the speaker apparatus.

Semi-circular longitudinal curved portions referred to as a roll edge are formed on the outer circumferences of the diaphragm 103 and the drive cone 105, and flange portions 61*a* and 62*a* extending from the outer ends of the roll edges 61 and 62 are fixed to the frame 107. The size and shape of the roll edges 61 and 62 are associated with the forward protruded size of the speaker apparatus, the volume of the enclosed space 119, and effective vibration areas of the diaphragm 103 and the drive cone 105, and also affects the frequency characteristic of the speaker apparatus.

However, in the speaker apparatus shown in FIG. 1B, the roll edge 61 of the diaphragm 103 is formed in a semi-circular shape with a single radius of curvature R in which the center A of the radius of curvature has the same height as the surface of the flange portion 61*a* connected to the roll edge 61, and the roll edge 62 of the drive cone 105 is a so-called tall edge in which the center B of the radius of curvature is deviated toward the edge bulging side from the flange portion 62*a* connected to the edge 62.

As described above, the enclosed space between the diaphragm 103 and the drive cone 105 serves as an air spring, but the volume of the enclosed space affects the spring constant, that is, the stiffness. The difference in effective vibration area between the diaphragm and the drive cone forming the enclosed space is also associated with the stiffness. When it is assumed that the effective vibration area of the diaphragm is S1, the effective vibration area of the drive cone is S2, and the volume of the enclosed space is V, the spring constant of the air spring in the enclosed space is proportional to (S1−S2)/V. When the spring constant is $s_0$ and the weight of the vibration system is $m_0$, the lowest resonant frequency $f_0$ is expressed by $f_0=(\frac{1}{2}\pi)\times\sqrt{(s_0/m_0)}$ . Accordingly, by decreasing the spring constant $s_0$, it is possible to lower the lowest resonant frequency.

Therefore, in order to decrease the spring constant and to lower the lowest resonant frequency, it is necessary to reduce the difference in effective vibration area between the diaphragm and the drive cone. For this purpose, for example, the roll edge of the diaphragm at the front side of the speaker apparatus can be formed in an edge shape with a single large radius of curvature. However, when the radius of curvature of the roll is merely increased, the height of the edge is also increased and the axial length of the speaker apparatus, that is, the length of the edge protruded from an attachment surface of the diaphragm, is increased, thereby damaging the decrease in thickness of the speaker apparatus. In addition, the outer diameter and length of the roll edge is restricted in specifications of the speaker apparatus, such as the diameter of the speaker apparatus or the draft taper of the frame.

According to a related-art speaker apparatus as shown in FIGS. 12A, 12B, the air in the enclosed space between the diaphragms serves as a spring, but the volume of the enclosed space affects a spring constant, that is, stiffness (see JP-UM-A-7-5199). Specifically, when the volume of the enclosed space between the diaphragms decreases, the stiffness increases and the lowest resonant frequency $f_0$ increases as much, thereby deteriorating low-frequency reproducibility of reproduced sound.

The connection member 875 having the structure shown in FIGS. 12A and 12B has an enclosed ring shape in which a plate is formed in a ring shape and the inside of the ring-shaped connection member 875 (the hatched part in FIG. 12A) does not communicate with the enclosed space 867. Accordingly, the volume of the enclosed space 867 is reduced as much as the volume of the connection member 875.

On the other hand, when the number of connection members 875 increases, the rigidity of the diaphragm 841 and the drive cone 842 increases but the volume of the enclosed space 467 is reduced as much, thereby hindering the reduction of the lowest resonant frequency.

In recent years, a speaker apparatus for reproducing middle or low-frequency sound such as a woofer or a sub woofer was more often built in a car audio system.

In such a car-mounting speaker apparatus, it is important to decrease in thickness of the speaker apparatus so that the speaker apparatus can be installed in portions having a defined depth such as a door or a ceiling panel.

In the related-art speaker apparatus 1000, as shown in FIG. 16, in which the voice coil bobbin 1011 is elastically supported by the damper 1025 as described above, a space for installing the damper 1025 should be secured between the diaphragm 1009 and the magnetic circuit 1003. Accordingly, in order to secure the space for installing the damper 1025, it is difficult to reduce the axial size of the speaker apparatus, thereby hindering the decrease in thickness of the speaker apparatus.

Generally, since the damper 1025 has stiffness greater than that of the edge 1007, the mechanical fatigue due to use for a long time is generated earlier than the edge 1007, and thus the deterioration in controllability can cause disorder.

Singular vibration or fictional sound is generated due to the deformation of the bellows at the time of propagation of vibration between the adjacent bellows in the damper 1025 and reversely affects the vibration of the voice coil 1012 or the diaphragm 1009, thereby making the sound quality muddy.

Generally, when it is assumed that the weight of the vibration system of the speaker apparatus is $M_{ms}$ and the total compliance (reciprocal of spring constant) of the speaker apparatus is $C_{ms}$, the lowest resonant frequency f0 of the speaker apparatus is expressed by $f_0=(½π)×\sqrt{(1/(M_{ms}×C_{ms})}$. In the damper-supporting type speaker apparatus shown in FIG. 16, since the spring component includes the spring property of the damper and the diaphragm and the spring constant is constant, the lowest resonant frequency associated with the spring constant is constant for the speaker apparatus.

In the speaker apparatus disclosed in JP-A-2000-308174 and JP-A-2001-157290, the low-frequency characteristic can vary by variation in compressing force of the spring. In this case, the change in low-frequency characteristic can be performed in the step that a maker manufactures the speaker apparatus, and a user cannot adjust the low-frequency characteristic to a desired low-frequency characteristic.

The present invention has been made in view of the above circumstances and provides a speaker apparatus and its production method.

According to an aspect of the present invention, a speaker apparatus has a sealed space between a diaphragm and a drive cone. A voice coil is supported by a spring property of air contained in the sealed space. The correction of the sealed space can be easily carried out, the disuse cost can be suppressed to reduce the economical loss when a non-correctable defect occurs in the enclosed space, the machining cost for a frame which is a relatively large component can be reduced to accomplish decrease in cost for a product, and unnecessary vibration from a magnetic circuit does not affect the diaphragm to accomplish improvement in acoustic characteristic or reproducibility, and a manufacturing method thereof.

According to another aspect of the invention, a speaker apparatus has a sealed space between a diaphragm and a drive cone disposed concentrically. A voice coil is supported by a spring property of air contained in the enclosed space. It is possible to enhance the speaker performance by increasing the outer diameter of a magnet in a magnet circuit without increasing cost. It is also possible to easily cope with the change in shape of the magnet following the change in shape of the drive cone without increasing cost.

Another aspect of the present invention is intended to solve the following problems in the speaker apparatus in which the vibration system is supported by a air spring in the enclosed space between the diaphragms: a problem that the volume of the enclosed space is reduced due to the rib-shaped connection members for connecting the diaphragms so as to enhance the rigidity of the diaphragms; a problem that much cost is required to allow the inside of the connection member to communicate with the enclosed space by forming a vent hole through the sidewall of the enclosed ring-shaped connection member by the use of machining or the like and thus it is not practical; and a problem that it is difficult to make the sufficient reinforcement of the diaphragms consistent with the sufficient volume of the enclosed space by the use of the related-art ring-shaped connection member.

Another aspect of the present invention is contrived to solve the following problems: a problem that it is difficult to reduce the axial size of the speaker apparatus so as to secure the space for installing the related-art damper; a problem that the mechanical fatigue of the damper can be generated due to use for a long time and the deterioration in ability of supporting the diaphragm causes disorder; a problem that singular vibration or fictional sound occurs due to deformation of the damper; and a problem that a user cannot change the low-frequency characteristic depending upon his or her taste.

Another aspect of the present invention is contrived to solve the following problems in a speaker apparatus for supporting a vibration system by the use of an air spring in an enclosed space between a diaphragm and a drive cone: a problem that it is limited to further lower the stiffness of the air spring in the diaphragm having a roll edge with a single radius of curvature under the condition of the speaker diameter and the length of the roll edge protruded from the front side thereof, which are restricted in specifications; and a problem that the decrease in thickness is not accomplished in order to increase the volume of the enclosed space between the diaphragms and to lower the stiffness.

According to another aspect of the invention, a speaker apparatus comprises; a diaphragm, a drive cone which is disposed in back of the diaphragm to be concentric with the diaphragm and of which the inner circumference is attached integrally to the inner circumference of the diaphragm, a frame of which the front end is fitted with a diaphragm support for supporting the outer circumferences of the diaphragm and the drive cone, a magnetic circuit which is disposed between the rear end of the frame and the drive cone so as to drive the diaphragm, and a voice coil which is wound on a voice coil bobbin bonded integrally to the inner circumference of the drive cone and which is inserted into a magnetic gap of the magnetic circuit, in which a space between the diaphragm and the drive cone is an enclosed space and a vibration system including the voice coil is supported by a spring property of air contained in the enclosed space, wherein a bracket having a cylindrical wall portion inserted into the diaphragm support of the frame, a frame fixing portion which extends outwardly in the diameter direction from an end of the cylindrical wall portion and is fixed to the diaphragm support of the frame, a first support which is fitted to the end of the cylindrical wall portion and is air-tightly fixed to the outer circumference of the diaphragm, and a second support which is fitted to the other end of the cylindrical wall portion and is fixed to the outer circumference of the drive cone is provided, and wherein the cylindrical wall portion of the bracket defines the space between the diaphragm and the drive cone as the enclosed space, and the outer circumferences of the diaphragm and the drive cone are fixed to the frame through the bracket.

According to another aspect of the present invention, there is provided a method of manufacturing the speaker apparatus described above, wherein the diaphragm and the drive cone are fixed to the bracket, the diaphragm assembly in which the enclosed space is defined between the diaphragm and the drive cone, and the diaphragm assembly is fitted to the frame to which the magnetic circuit has been fitted.

According to an aspect of the present invention, there is provided a speaker apparatus comprising a diaphragm, a drive cone which is disposed in back of the diaphragm to be concentric with the diaphragm and of which the inner circumference is attached integrally to the inner circumference of the diaphragm, a frame of which the front end is fitted with a diaphragm support for supporting the outer circumferences of the diaphragm and the drive cone, a magnetic circuit which is disposed between the rear end of the frame and the drive cone so as to drive the diaphragm, and a voice coil which is wound on a voice coil bobbin bonded integrally to the inner circumference of the drive cone and which is inserted into a magnetic gap of the magnetic circuit, in which a space between the diaphragm and the drive cone forms an enclosed space and a vibration system including the voice coil is supported by a spring property of air contained in the enclosed space, wherein a ring-shaped magnet of the magnetic circuit is formed by stacking a plurality of unit magnets and an outline corresponding to the shape of a housing space between the frame and the drive cone is given by using two or more kinds of unit magnets having different outer diameters as the plurality of unit magnets.

According to another aspect of the present invention, there is provided a diaphragm-reinforced speaker apparatus comprising a diaphragm disposed in a driving direction and a drive cone for delivering a drive power of a voice coil to the diaphragm, wherein the outer circumferences of the diaphragm and the drive cone are fixed to diaphragm supports of a frame, a space surrounded with the diaphragm, the drive cone, and the frame is an enclosed space, the diaphragm and the drive cone are connected to each other through non-ring-shaped connection pieces in the enclosed space, and a vibration system is supported through a voice coil bobbin by a spring property of air in the enclosed space.

According to an aspect of the present invention, there is provided a frequency variable speaker apparatus comprising a diaphragm disposed in a driving direction and a drive cone for delivering a drive power of a voice coil to the diaphragm, wherein the outer circumferences of the diaphragm and the drive cone are fixed to diaphragm supports of a frame, the inner circumferences of the diaphragm and the drive cone are bonded to each other and then fixed to a voice coil bobbin, an enclosed hollow attachment communicating with an enclosed space defined by the diaphragm, the drive cone, and the frame is detachably attached to the outer circumference of the frame, and a spring constant of an air spring of the enclosed space is variable by replacing the enclosed hollow attachment with another enclosed hollow attachment having a different volume.

According to another aspect of the present invention, there is provided a speaker apparatus comprising a diaphragm disposed in a driving direction and a drive cone for delivering a drive power of a voice coil to the diaphragm, in which the outer circumferences of the diaphragm and the drive cone are fixed to diaphragm supports of a frame, a space surrounded with the diaphragm, the drive cone, and the frame is an enclosed space, and a vibration system is supported through a voice coil bobbin by a spring property of air in the enclosed space, wherein a roll edge constituting the outer circumference of the diaphragm is formed in a horizontally longitudinal shape with different radii of curvature and a roll edge constituting the outer circumference of the drive cone is formed in a tall edge shape of which the center of the radius of curvature is deviated toward an edge bulging side from a flange portion connected to the roll edge of the diaphragm.

BRIEF DESCRIPTION OF THE DRAWINGS

These and other objects and advantages of this invention will become more fully apparent from the following detailed description taken with the accompanying drawings in which:

FIG. 8A is a front view and FIG. 8B is a cross-sectional view taken along Line A-A of FIG. 8A;

FIG. 9A is a front view and FIG. 9B is a cross-sectional view taken along Line A-A of FIG. 9A;

FIGS. 14A, 14B, 14C, and 14D are transverse sectional views illustrating various shapes of a non-ring-shaped connection piece used for the fifth embodiment;

FIG. 15 is a graph illustrating a relation between the volume V of an enclosed space and the lowest resonant frequency $f_0$;

DESCRIPTION OF EMBODIMENTS

Hereinafter, a speaker apparatus and a manufacturing method thereof according to exemplary embodiments of the present invention will be described in detail with reference to the drawings.

Figure 2:
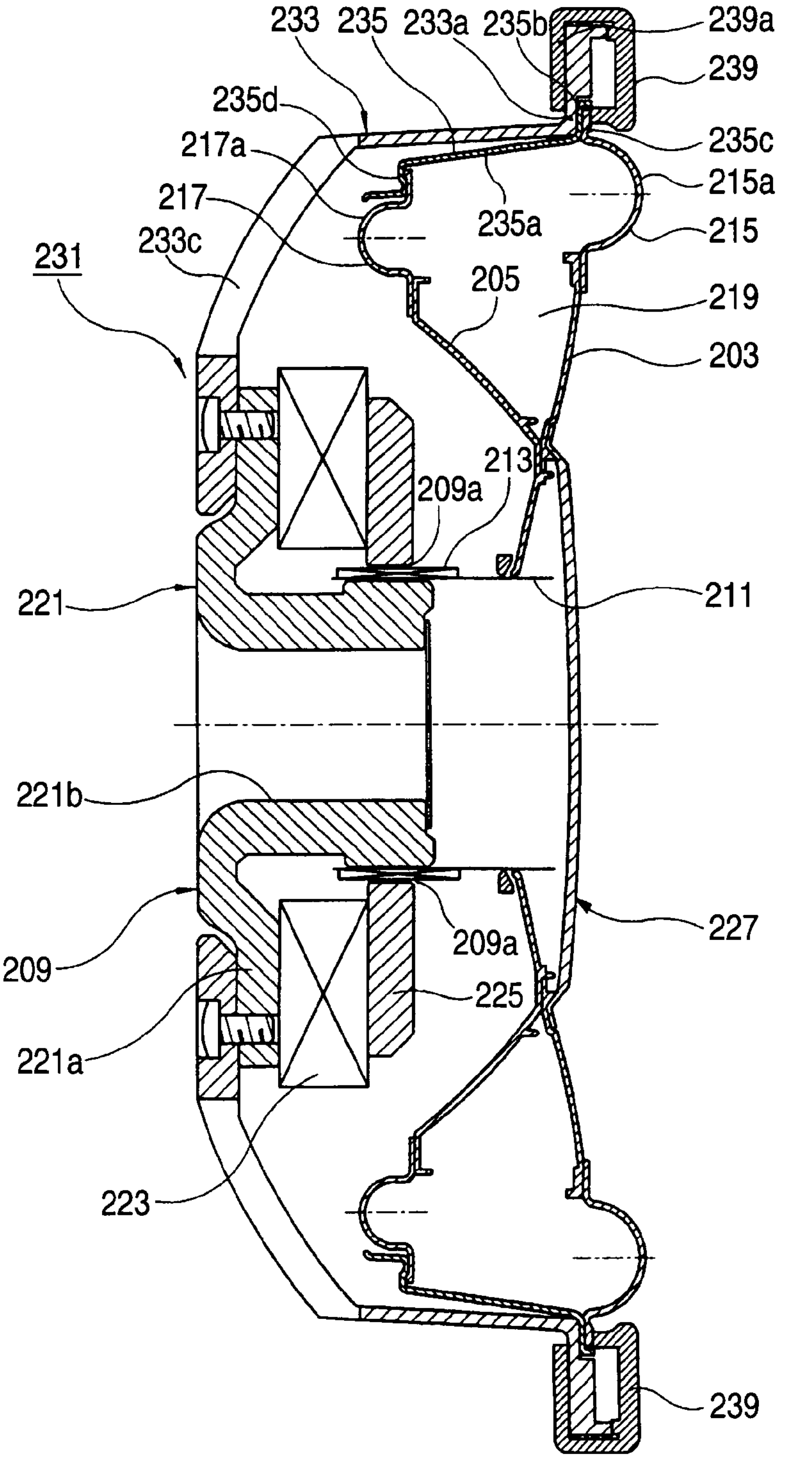
FIG. 2 is a longitudinal sectional view illustrating a configuration of a speaker apparatus according to a first embodiment of the present invention.
Figure 3:
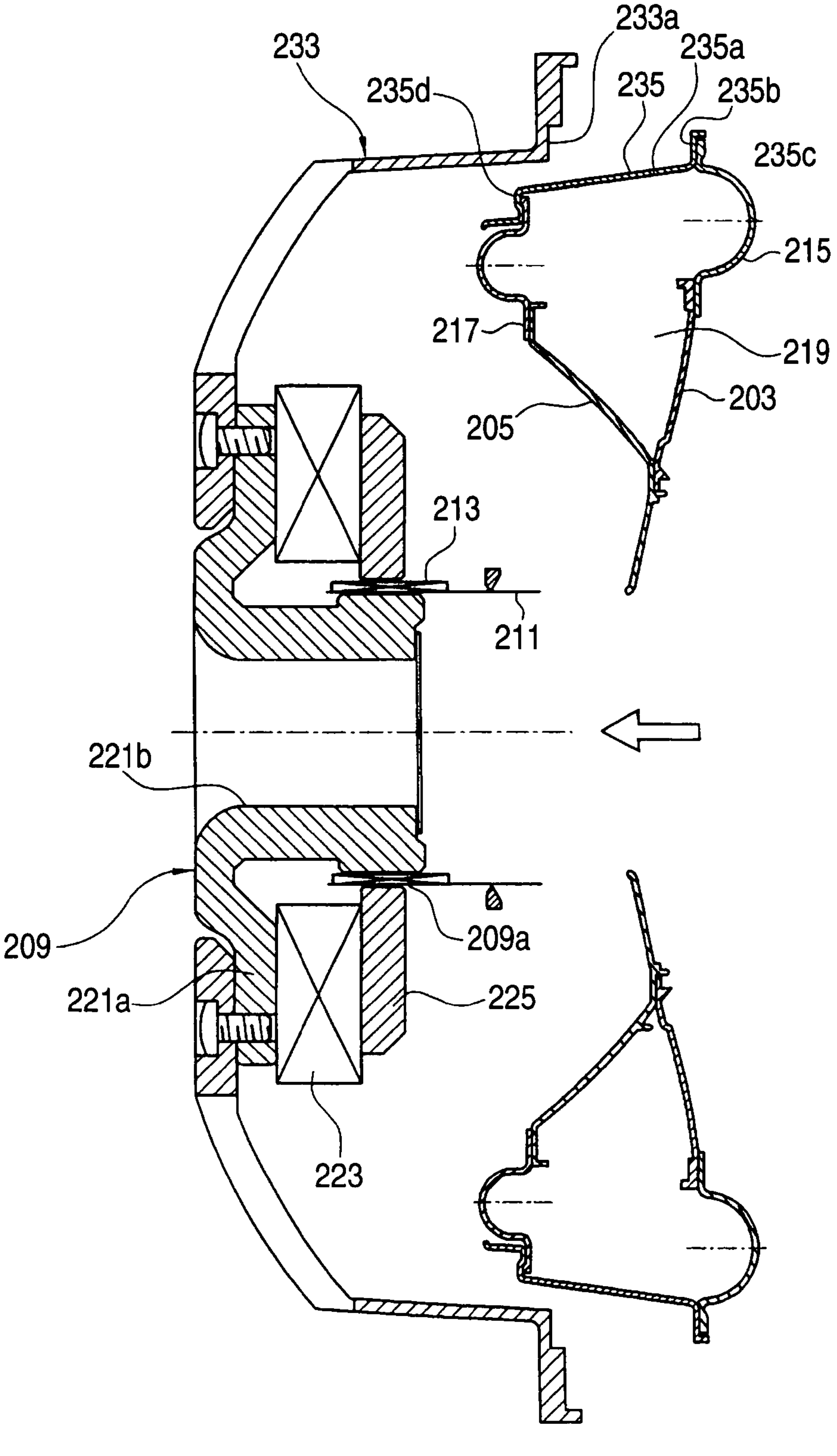
FIG. 3 is an exploded sectional view illustrating a method of manufacturing the speaker apparatus shown in FIG. 2.
Figure 4:
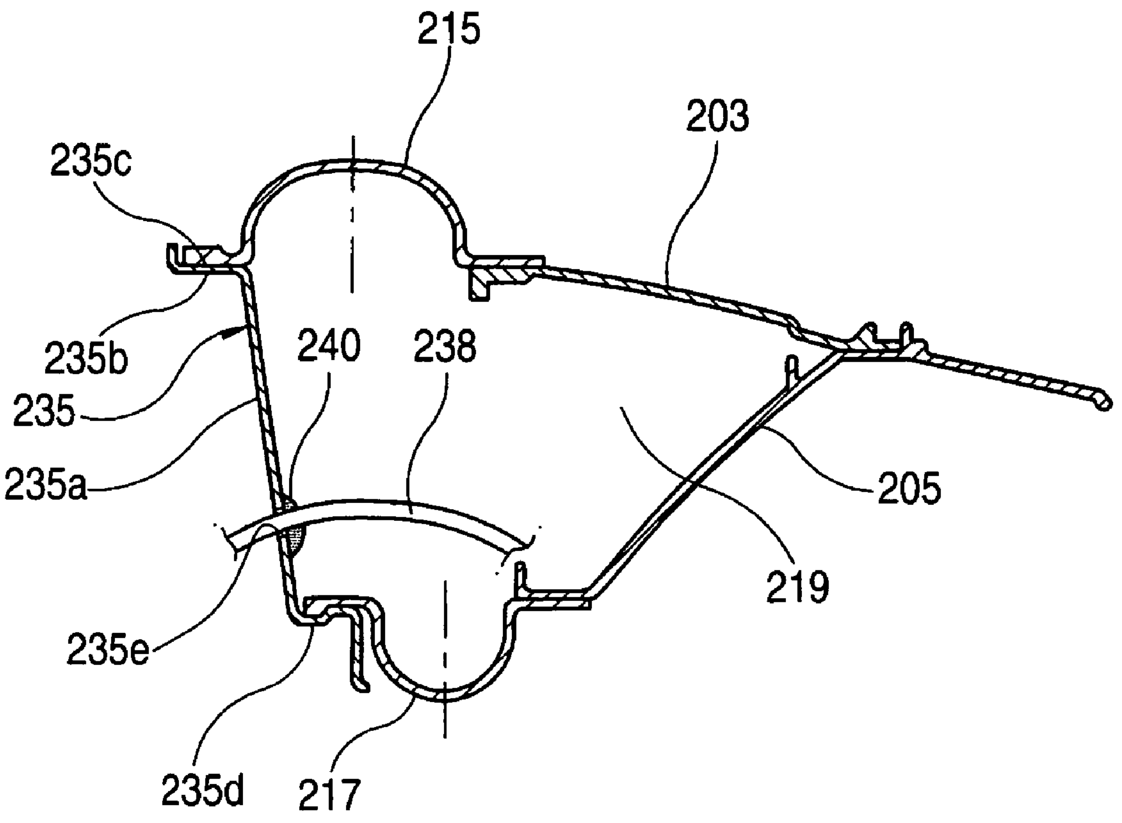
FIG. 4 is a partially enlarged sectional view illustrating a connection structure of a wire in the speaker apparatus shown in FIG. 2.

FIG. 2 is a longitudinal sectional view illustrating a configuration of the speaker apparatus according to a first embodiment of the invention, FIG. 3 is an exploded sectional view illustrating a method of manufacturing the speaker apparatus shown in FIG. 2, and FIG. 4 is a partially enlarged sectional view illustrating a connection structure of wires in the speaker apparatus shown in FIG. 2.

The speaker apparatus 231 according to the first embodiment includes a diaphragm 203, a drive cone 205 which is disposed in back of the diaphragm 203 to be concentric with the diaphragm 203 and of which the inner circumference is attached integrally to the inner circumference of the diaphragm 203, a frame 233 of which the front end is fitted with a diaphragm support 233*a* for supporting the outer circumferences of the diaphragm 203 and the drive cone 205 and in which a magnetic circuit 209 is fitted to the central axis of the rear end, and a voice coil 213 which is wound on a voice coil bobbin 211 bonded integrally to the inner circumferences of the diaphragm 203 and the drive cone 205 and which is inserted into a magnetic gap 209*a* of the magnetic circuit 209. A space between the diaphragm 203 and the drive cone 305 forms an enclosed space 219, and a vibration system including the voice coil 213 is supported by a spring property of air contained in the enclosed space 219.

In the speaker apparatus 231 according to the first embodiment, the outer circumferences of the diaphragm 203 and the drive cone 205 are air-tightly fixed to a bracket 235 formed out of a metal plate and is fixed to the frame 233 through the bracket 235.

The bracket 235 includes a cylindrical wall portion 235*a* inserted into the inside of the diaphragm support 233*a* of the frame 233, a frame fixing portion 235*b* which extends to the outside in the diameter direction from an end of the cylindrical wall portion 235*a* and is fixed to the diaphragm support 233*a* of the frame 233, a first support 235*c* which is fitted to the end of the cylindrical wall portion 235*a* and to which the outer circumference of the diaphragm 203 is air-tightly fixed through an edge damper 215, and a second support 235*d* which is fitted to the other end of the cylindrical wall portion 235*a* and to which the outer circumference of the drive cone 205 is air-tightly fixed through an edge damper 217.

The frame fixing portion 235*b* is a flange portion extending in a collar shape to the outside in the diameter direction from the end of the cylindrical wall portion 235*a*, and the surface of the frame fixing portion 235*b* serves as the first support 235*c*.

The cylindrical wall portion 235*a* of the bracket 235 defines the space between the diaphragm 203 and the drive cone 205 as the enclosed space 219. The outer circumferences of the diaphragm 203 and the drive cone 205 are fixed to the frame 233 by fixing the frame fixing portion 235*b* of the bracket 235 to the diaphragm support 233*a*.

Figure 1A:
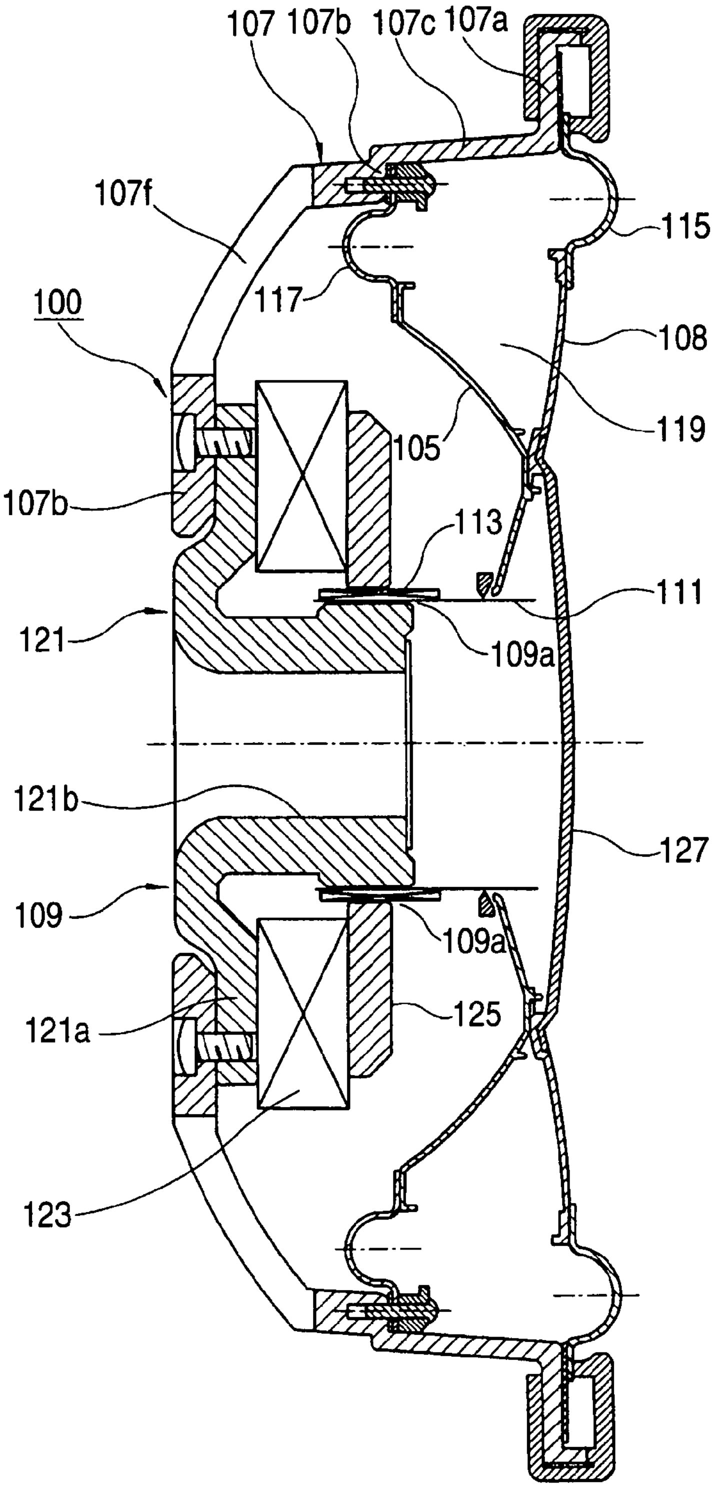
FIG. 1A RELATED ART
FIGS. 1A and 1B are longitudinal sectional views illustrating a configuration of a related-art speaker apparatus.
Figure 1B:
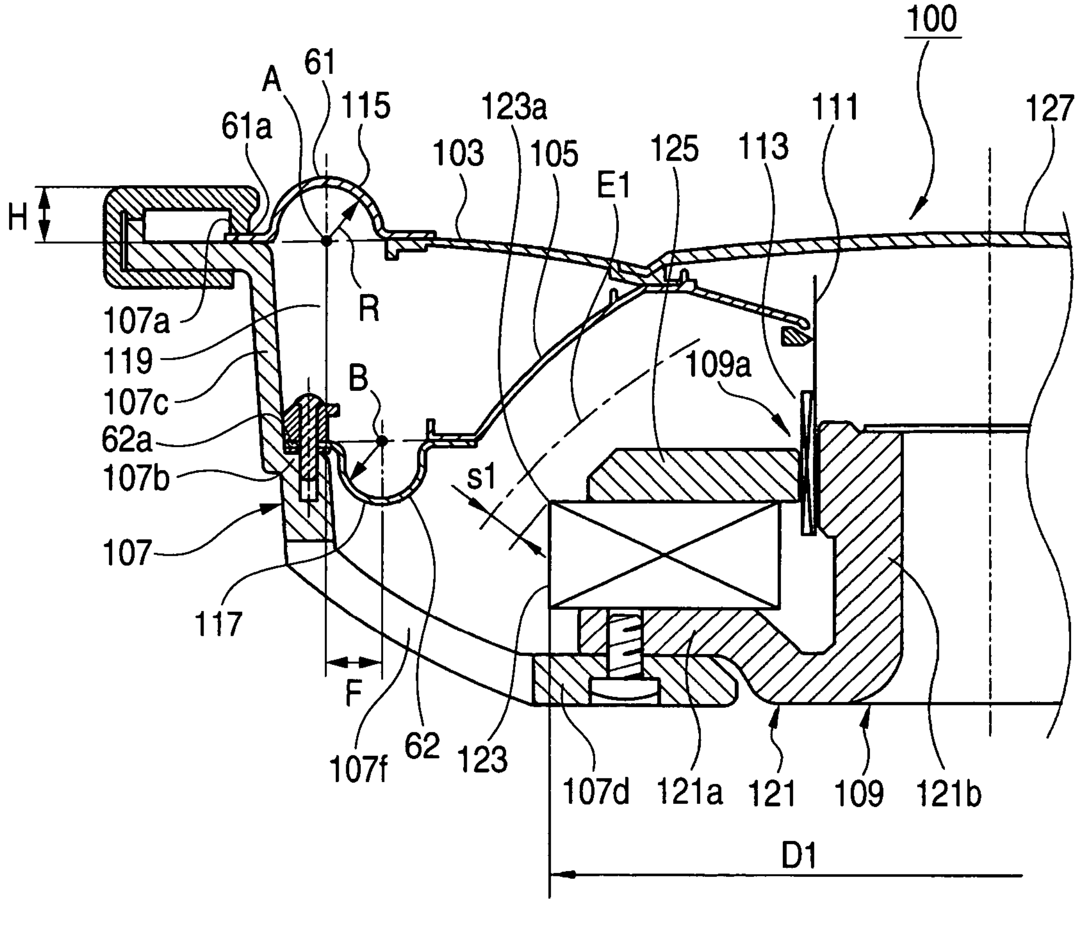

The magnetic circuit 209 fixed to the rear end wall 233*b* of the frame 233 has the same configuration as the speaker apparatus shown in FIGS. 1A and 1B. An opening 233*c* as a vent hole for discharging back pressure of the diaphragm is properly formed between the rear end wall 233*b* of the frame 233 and the diaphragm support 233*a*.

In the method of manufacturing the speaker apparatus 231 according to the embodiment, as shown in FIG. 3, the diaphragm 203 and the drive cone 205 are fixed to the bracket 235, thereby forming a diaphragm assembly 237 in which the enclosed space 219 is defined between the diaphragm 203 and the drive cone 205.

In forming the diaphragm assembly 237, as shown in FIG. 4, the wire 238 drawn out of the drive cone 205 is inserted into a wire-insertion hole 235*e* formed through the cylindrical wall portion 235*a* of the bracket 235 and is drawn out of the bracket 235. The wire drawn out of the bracket 235 is bonded to an input terminal formed on the frame 233 by soldering or the like. The gap of the wire-insertion hole 235*e* into which the wire 238 is inserted is enclosed by application of an adhesive 240. When the bracket 235 is a bracket made of a conductive member such as a metal plate, the wire 238 may have an insulating coating such as a rubber coating so that the wire is not electrically connected to the bracket 235.

When no defect is checked as an inspection result of air tightness or a spring property of the enclosed space 219 in the diaphragm assembly 237, the diaphragm assembly 237 is fitted into the frame 233 to which the magnetic circuit 209 and the like has been fitted. When the attachment of the voice coil bobbin 211 to the drive cone 205 in the enclosed space 219 is finished, as shown in FIG. 2, a dust cap 227 is attached to the central opening of the diaphragm 203 to prevent dust from invading the magnetic gap 109*a*.

The contact surfaces of the frame fixing portion 235*b* of the bracket 235 and the diaphragm support 233*a* are bonded to each other by the use of a double-sided adhesive tape or an adhesive which is not cured, thereby fixing the frame 233 and the bracket 235 to each other.

Packing 239 serves as a packing material for attaching a speaker to a cabinet and forms an appearance as seen from the front side. The packing 239 has a substantially "C" shape surrounding the contact portions between the frame fixing portion 235*b* and the diaphragm support 233*a*, thereby enhancing the air tightness of the contact portions.

The packing 239 comes in close contact with the baffle of the speaker cabinet, thereby enhancing the air tightness with the baffle and blocking the delivery of unnecessary vibration between the baffle and the speaker apparatus.

Since the speaker apparatus 231 described above is a speaker apparatus in which the space between the diaphragm 203 and the drive cone 205 disposed concentrically is the enclosed space 219 and the voice coil 213 is supported by the spring property of air contained in the enclosed space 219, it is not necessary to provide a specific damper for controlling the vibration of the voice coil bobbin 211, the diaphragm 303, or the drive cone 205.

Accordingly, the axial size of the speaker apparatus 231 is reduced due to omission of the specific damper and the installation space thereof, and it is thus possible to reduce the thickness of the speaker apparatus 231, which is required for a car audio system or the like.

Since the drive cone 205 can be made of the same material as the diaphragm 203, the weight is smaller and the mechanical fatigue is less generated, in comparison with the related-art bellows-shaped damper. Accordingly, it is possible to prevent deterioration in damping ability due to the mechanical fatigue of the constituent elements, thereby elongating the life time of the speaker apparatus 231. In addition, since large deformation is not locally generated, singular vibration or frictional sound making sound quality muddy does not occur. Accordingly, it is possible to reproduce sound with high quality without muddiness.

In the speaker apparatus 231 according to the embodiment, by fitting the diaphragm 203 and the drive cone 205 to the bracket 235, the diaphragm assembly 237 is obtained in which the space between the diaphragm 203 and the drive cone 205 is the enclosed space 219. Before attaching the diaphragm assembly 237 to the frame 233, it is possible to detect any defect in the enclosed space 219. When a correctable defect is detected, the correction work can be performed with the small and light state before attaching the diaphragm assembly to the frame 233. Accordingly, it is possible to easily correct the enclosed space 219.

Even when a non-correctable defect occurs in the enclosed space 219, only the diaphragm 203, the drive cone 205, and the bracket 235 can be disused, regardless of the constituent elements such as the magnetic circuit 241 built in the frame 233. Accordingly, it is possible to suppress the disuse cost and thus to reduce the economical loss.

As a method of manufacturing the speaker apparatus 231 according to the embodiment, as described above, a manufacturing method of first forming the diaphragm assembly 237 and then fitting the diaphragm assembly 237 into the frame 233 to which the magnetic circuit 241 and the like have been fitted can be employed.

In this manufacturing method, since the diaphragm support 233*a* fitted to the frame 233 requires only one place to which the bracket 235 of the diaphragm assembly 237 is fixed, it is not necessary to individually provide the diaphragm supports for the diaphragms. That is, since the number of places on the frame 233 to which the diaphragm supports 233*a* would be fixed decreases, it is possible to reduce the cost for processing the frame 233 which is a relatively large component and thus to accomplish the decrease in production cost.

In addition, since the number of places for the diaphragm support 233*a* is one, the gap between the rear end wall 233*b* of the frame 233 and the diaphragm support 233*a* is enlarged. Accordingly, by enlarging the opening 233*c* as a vent hole formed in the gap, it is possible to reduce the weight of the speaker apparatus.

In the speaker apparatus 231 according to the embodiment, since the packing 239 for bringing the diaphragm support 233*a* of the frame 233 and the frame support 235*b* of the bracket 235 into close contact with each other is made of a vibration absorbing material such as rubber, the vibration delivered between the frame 233 and the bracket 235 is blocked. Accordingly, the unnecessary vibration from the magnetic circuit 209 does not affect the diaphragm, thereby improving the acoustic characteristic or the reproducibility.

Figure 5:
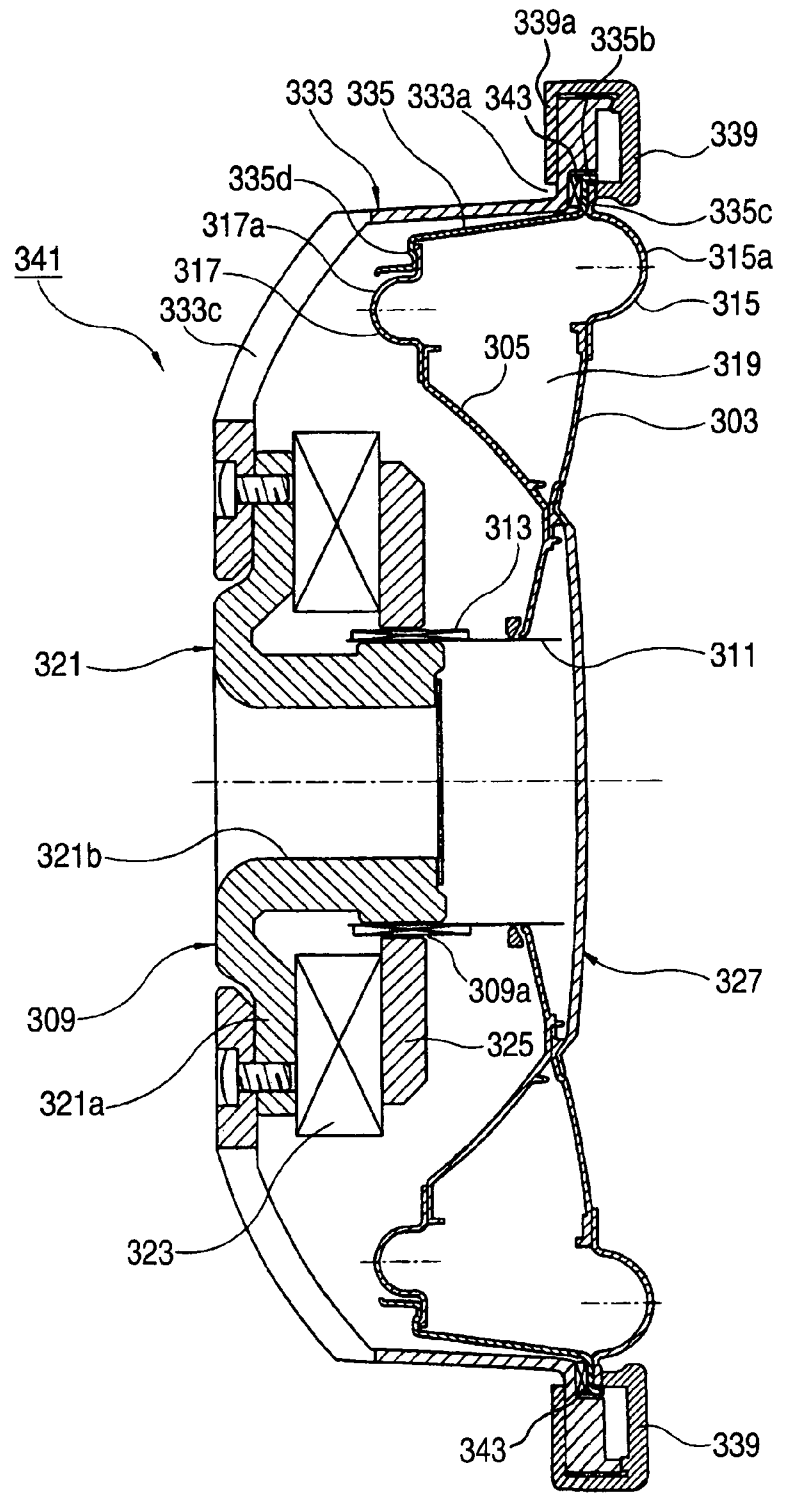
FIG. 5 is a longitudinal sectional view illustrating a configuration of a speaker apparatus according to a second embodiment of the present invention.

FIG. 5 is a longitudinal sectional view illustrating a speaker apparatus according to a second embodiment of the present invention. In the speaker apparatus 341 according to the second embodiment, an elastic sealing member 343 having a high cushion property is interposed between the contact portions of the diaphragm support 333*a* of the frame 333 and the frame fixing portion 335*b* of the bracket 335

The second embodiment has the same configuration as the first embodiment, except for providing the sealing member 343.

In the speaker apparatus 331 according to the second embodiment, since the sealing member 343 interposed between the contact portions of the diaphragm support 333*a* of the frame 333 and the frame fixing portion 335*b* of the bracket 335 has a vibration damping effect by its vibration, unnecessary vibration from the magnetic circuit 309 does not affect the diaphragm, thereby accomplishing improvement in acoustic characteristic or reproducibility.

Figure 6:
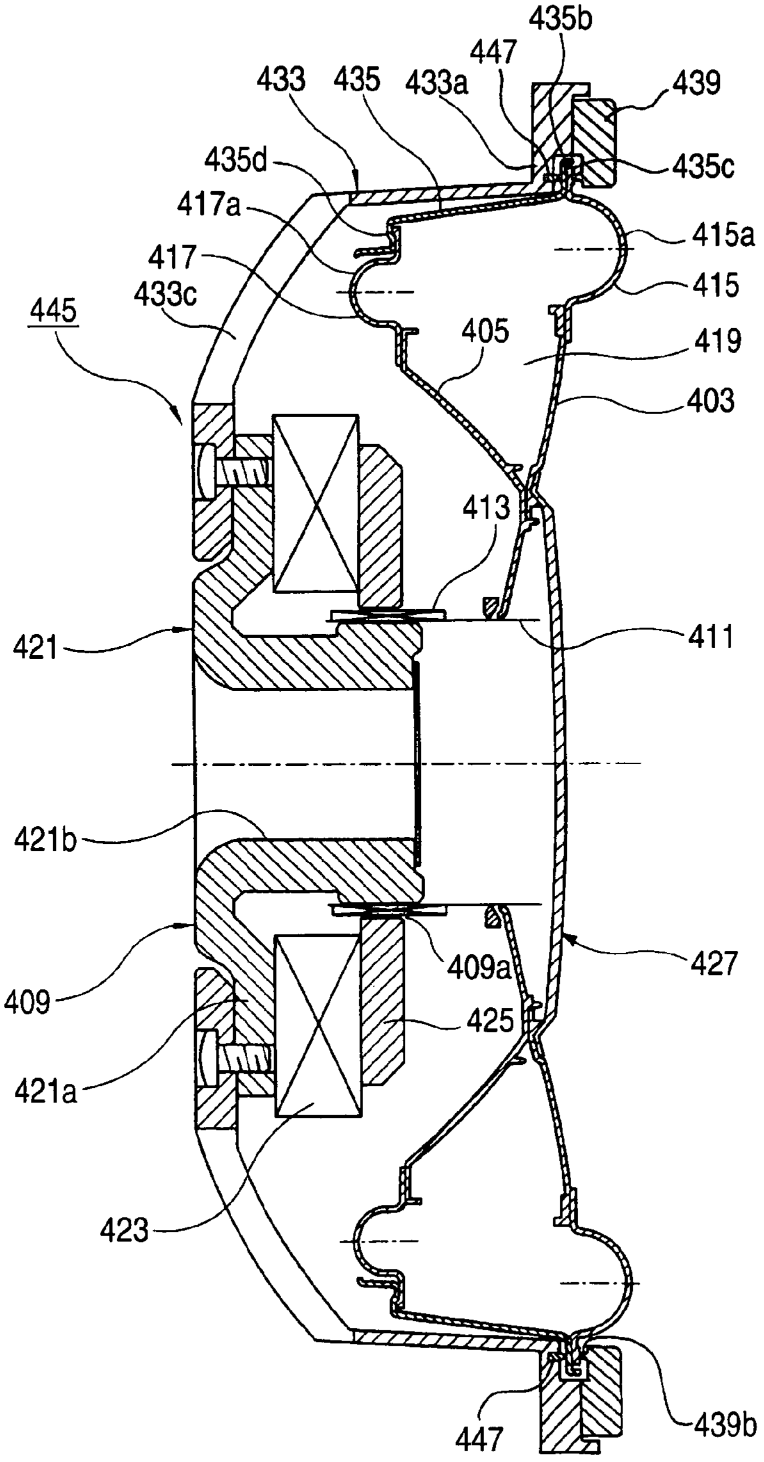
FIG. 6 is a longitudinal sectional view illustrating a configuration of a speaker apparatus according to a third embodiment of the present invention.

FIG. 6 is a longitudinal sectional view illustrating a speaker apparatus according to a third embodiment of the present invention. In the speaker apparatus 445 according to the third embodiment, an O ring 447 having a small area contacting the frame fixing portion 435*b* is interposed as an elastic sealing member between the contact portions of the diaphragm support 433*a* of the frame 433 and the frame fixing portion 435*b* of the bracket 435, and a portion of the packing 439 pressing the edge damper 415 is formed as an elastic protrusion 439*b* having a small contact area. The elastic protrusion 439*b* is continuously formed along the outer circumference of the edge damper 415 and serves as the O ring.

As a result, it is possible to further improve the effect of blocking the unnecessary vibration delivered between the frame 433 and the bracket 435 and thus to further enhance the acoustic characteristic or the reproducibility.

Figure 7:
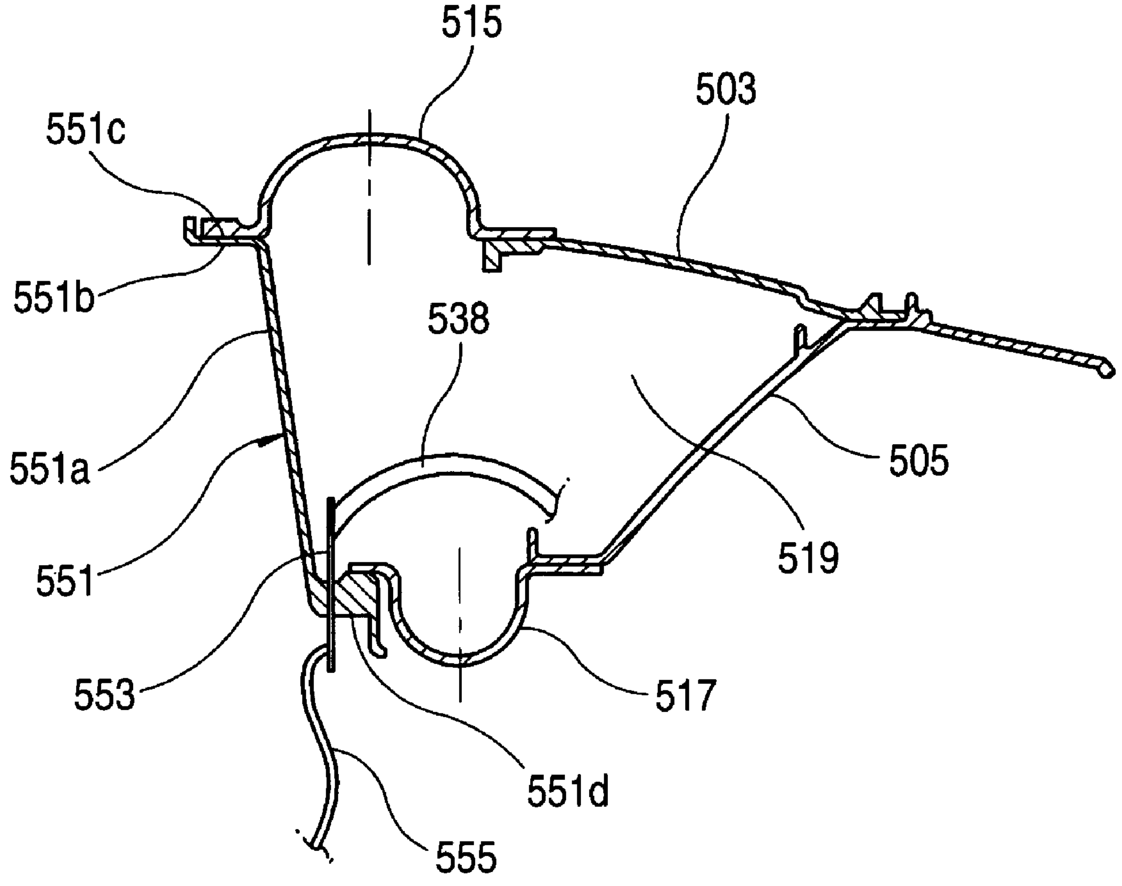
FIG. 7 is a partially enlarged sectional view illustrating a connection structure of a wire in an example of a bracket of the embodiments.

FIG. 7 illustrates another example of the bracket for supporting the outer circumferences of a diaphragm 503 and a drive cone 505 and making a space between the diaphragm 503 and the drive cone 505 an enclosed space 519 in the speaker according to the third embodiment of the present invention.

The bracket 551 shown in the figure includes a cylindrical wall portion 551*a* inserted into the inside of the diaphragm support 533*a* of the frame 533, a frame fixing portion 551*b* which extends to the outside in the diameter direction from an end of the cylindrical wall portion 551*a* and is fixed to the diaphragm support 533*a* of the frame 533, a first support 551*c* which is fitted to the end of the cylindrical wall portion 551*a* and to which the outer circumference of the diaphragm 503 is air-tightly fixed through an edge damper 515, and a second support 551*d* which is fitted to the other end of the cylindrical wall portion 551*a* and to which the outer circumference of the drive cone 505 is air-tightly fixed through an edge damper 517. The configuration thereof is similar to that of the bracket 235 shown in FIG. 4.

Similarly to the bracket 235 shown in FIG. 4, the frame fixing portion 551*b* is a flange portion extending in a collar shape outwardly in the diameter direction from the end of the cylindrical wall portion 551*a*, the surface of the frame fixing portion 551*b* serves as the first support 551*c*, the cylindrical wall portion 551*a* defines the space between the diaphragm 503 and the drive cone 505 as the enclosed space 519, the outer circumferences of the diaphragm 503 and the drive cone 505 are fixed to the frame 533 by fixing the frame fixing portion 551*b* of the bracket 535 to the diaphragm support 533*a*.

The bracket 551 is not formed out of a metal plate, but is integrally formed by an injection molding process of a non-conductive resin material. The terminal lug 553 connected to the wire 538 drawn out of the drive cone 505 is integrally formed with the bracket 551 by an insert molding process.

The terminal lug 553 is fitted to pass through the second support 551*d* of the bracket 551, an end thereof protruded into the enclosed space 519 is connected to the wire 538, and the other end thereof protruded out of the bracket 551 is connected to a lead 555. The lead 555 electrically connects the input terminal provided in the frame 533 to the terminal lug 553.

In the bracket 551 described above, as shown in FIGS. 8A and 8B, the cylindrical wall portion 551*a* has a cylinder shape slightly tapered and a section perpendicular to the axis line is circular.

In the speaker apparatus employing the bracket 551, since the terminal lug 553 connected to the wire 538 is provided by the insert molding process, it is not necessary to form a wire-insertion hole through the bracket 551 and it is not necessary to seal the wire-insertion hole, thereby accomplishing improvement in productivity by omitting the above-mentioned processes. In addition, since the deterioration in air tightness due to sealing failure of the wire-insertion hole can be prevented, it is possible to secure stable damper performance in the enclosed space 519.

In the speaker apparatus employing the bracket 551, since the bracket 551 is non-conductive in comparison with the case employing the bracket 235 made of metal shown in FIG. 4, the contact of the wire 538 not having an insulating coating such as a rubber coating with the bracket 551 does not cause short-circuits, thereby improving the reliability in operation.

Figure 8A:
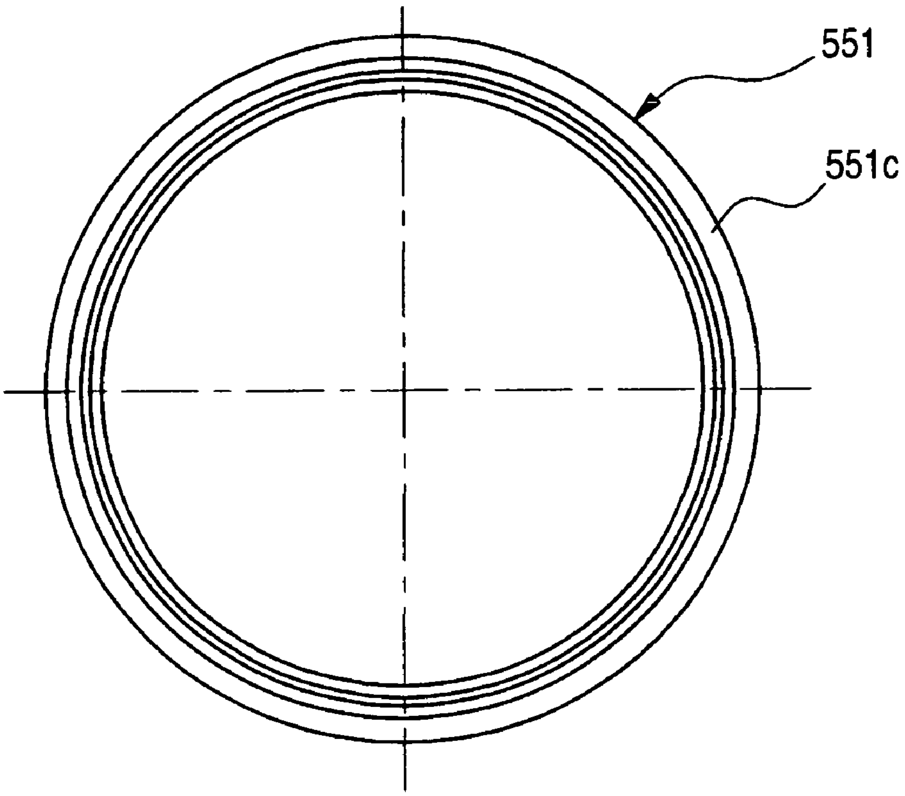
FIGS. 8A and 8B are explanatory diagrams illustrating the bracket shown in FIG. 7, where
Figure 8B:
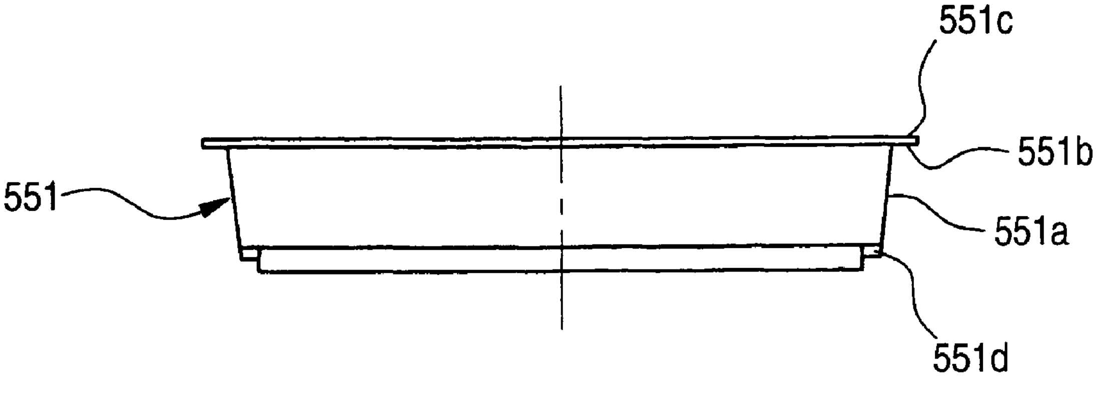
Figure 9A:
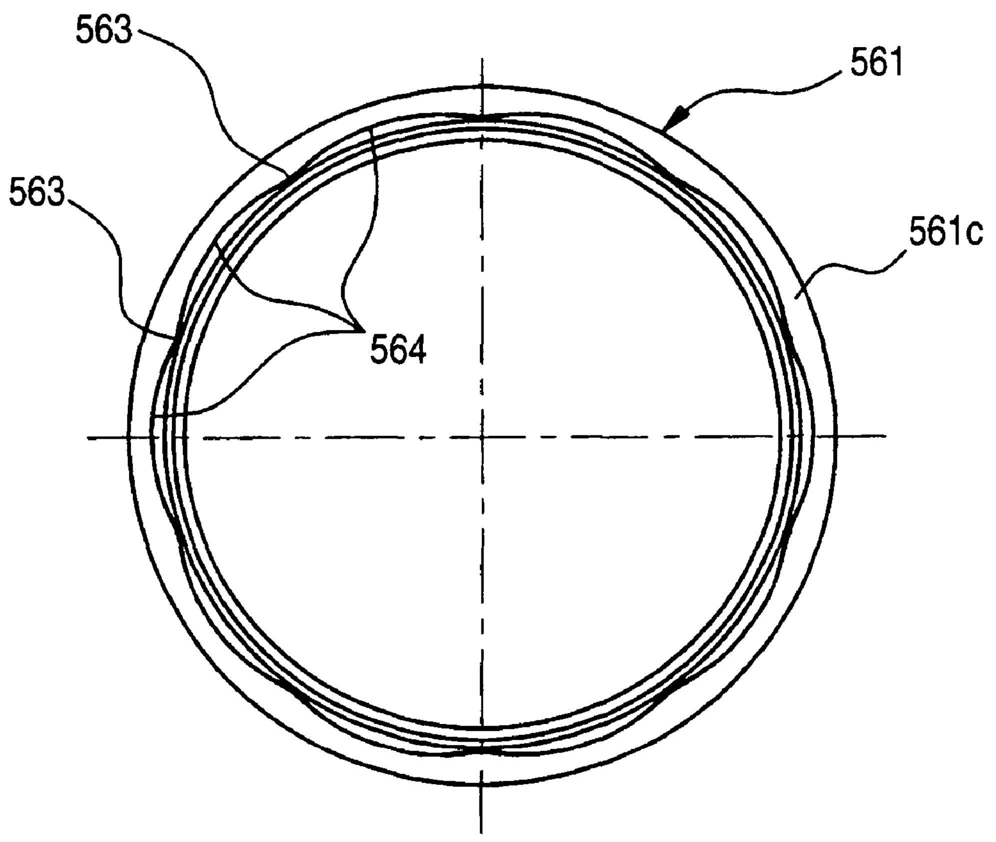
FIGS. 9A and 9B are explanatory diagrams illustrating the bracket shown in FIGS. 8A and 8B, where
Figure 9B:
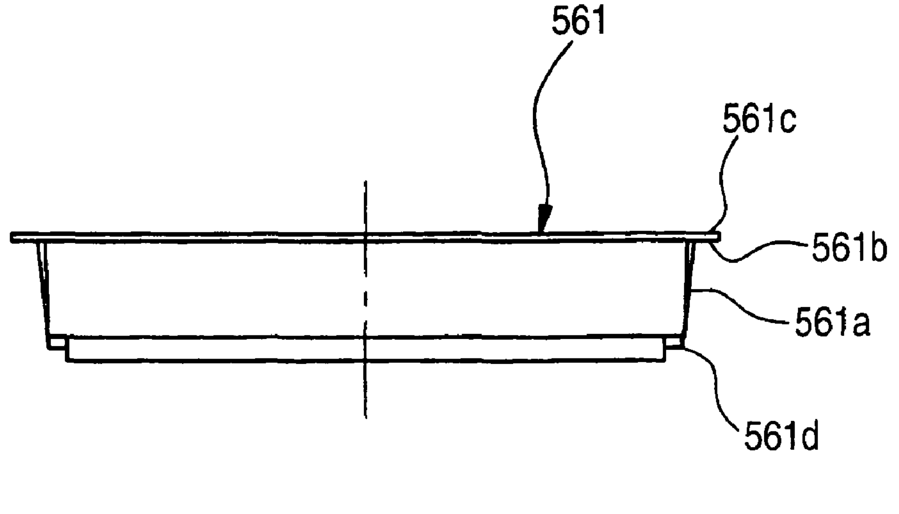

FIGS. 9A and 9B illustrate an improved structure of a bracket formed integrally by an insert molding process using a non-conductive resin material shown in FIGS. 7, 8A, and 8B.

In the bracket 561 according to the embodiment, the inner circumferential surface of the cylindrical wall portion 561*a* inserted into the inside of the diaphragm support 533*a* of the frame 533 has a non-circular section having plural inflection points 563 at plural positions in the circumferential direction, as shown in FIG. 9A. The other elements are similar to those of the bracket 551 shown in FIGS. 7, 8A, and 8B, and the similar elements are denoted by the same reference numerals and are not described.

Both sides of the respective inflection points 563 form a circular arc 564 having a proper radius and an intersection between the adjacent circular arcs 564 constitute the inflection point 563.

In the speaker apparatus employing the bracket 561 having the above-mentioned structure, since the vibration delivered from the diaphragm 503 and the drive cone 505 to the cylindrical wall portion 561*a* of the bracket 561 is damped by the inflection points 563 disposed at the plural positions in the circumferential direction, resonance due to standing waves in the enclosed space 519 less occurs. Accordingly, it is possible to accomplish further improvement in acoustic characteristic.

In the above-mentioned embodiments, a roll portion 515*a* allowing the amplitude of the diaphragm 503 is protruded toward the front side of the diaphragm from the edge damper 515. A roll portion 517*a* allowing the amplitude of the drive cone 505 is protruded toward the rear side of the diaphragm from the edge damper 517. By setting the directions of the roll portions 515*a* and 517*a* in this way, the volume of the enclosed space 519 can be secured as large as possible. However, if only a damper property necessary as an air cushion is obtained, the directions of the roll portions 515*a* and 517*a* are not limited to those of the embodiment. For example, the directions of the roll portions 515*a* and 517*a* may be set opposite to those of the embodiment.

As described above in detail, the speaker apparatus according to the embodiments of the present invention includes the diaphragm, the drive cone which is disposed in back of the diaphragm to be concentric with the diaphragm and of which the inner circumference is attached integrally to the inner circumference of the diaphragm, the frame of which the front end is fitted with the diaphragm support for supporting the outer circumferences of the diaphragm and the drive cone, the magnetic circuit which is disposed between the rear end of the frame and the drive cone so as to drive the diaphragm, and the voice coil which is wound on the voice coil bobbin bonded integrally to the inner circumference of the drive cone and which is inserted into the magnetic gap of the magnetic circuit, in which the space between the diaphragm and the drive cone is the enclosed space and the vibration system including the voice coil is supported by the spring property of air contained in the enclosed space. Here, the speaker apparatus further includes the bracket having a cylindrical wall portion inserted into the diaphragm support of the frame, a frame fixing portion which extends outwardly in the diameter direction from an end of the cylindrical wall portion and is fixed to the diaphragm support of the frame, a first support which is fitted to the end of the cylindrical wall portion and is air-tightly fixed to the outer circumference of the diaphragm, and a second support which is fitted to the other end of the cylindrical wall portion and is fixed to the outer circumference of the drive cone is provided. The cylindrical wall portion of the bracket defines the space between the diaphragm and the drive cone as the enclosed space, and the outer circumferences of the diaphragm and the drive cone are fixed to the frame through the bracket.

That is, since the speaker apparatus according to the embodiments is a speaker apparatus in which the space between the diaphragm and the drive cone disposed concentrically is the enclosed space and the voice coil is supported by the spring property of air contained in the enclosed space, it is not necessary to provide a specific damper for controlling the vibration of the voice coil bobbin, the diaphragm, the drive cone.

Accordingly, the axial size of the speaker apparatus is reduced due to omission of the specific damper and the installation space thereof, and it is thus possible to reduce the thickness of the speaker apparatus, which is required for a car audio system or the like.

Since the drive cone can be made of the same material as the diaphragm, the weight is smaller and the mechanical fatigue is less generated, in comparison with the related-art bellows-shaped damper. Accordingly, it is possible to prevent deterioration in damping ability due to the mechanical fatigue of the constituent elements, thereby elongating the life time of the speaker apparatus. In addition, since large deformation is not locally generated, singular vibration or frictional sound making sound quality muddy does not occur. Accordingly, it is possible to reproduce sound with high quality without muddiness.

By fitting the diaphragm and the drive cone to the bracket, the diaphragm assembly is obtained in which the space between the diaphragm and the drive cone is the enclosed space. Before attaching the diaphragm assembly to the frame, it is possible to detect any defect in the enclosed space. When a correctable defect is detected, the correction work can be performed with the small and light state before attaching the diaphragm assembly to the frame. Accordingly, it is possible to easily correct the enclosed space.

Even when a non-correctable defect occurs in the enclosed space, only the diaphragm, the drive cone, and the bracket can be disused, regardless of the constituent elements such as the magnetic circuit built in the frame. Accordingly, it is possible to suppress the disuse cost and thus to reduce the economical loss.

In the method of manufacturing the speaker apparatus according to the embodiment, the diaphragm assembly is formed by fixing the diaphragm and the drive cone to the bracket, and then the diaphragm assembly is fitted into the frame to which the magnetic circuit and the like have been fitted.

In this manufacturing method, since the diaphragm support fitted to the frame requires only one place to which the bracket of the diaphragm assembly is fixed, it is not necessary to individually provide the diaphragm supports for the diaphragms. That is, since the number of places on the frame to which the diaphragm supports would be fixed decreases, it is possible to reduce the machining cost for the frame which is a relatively large component and thus to accomplish the decrease in production cost.

The drive cone is not limited to the shape described in the above-mentioned embodiments, but may have any shape if only it can deliver the drive power of the voice coil to the diaphragm.

Hereinafter, a speaker apparatus according to a fourth embodiment will be described in detail with reference to the drawings.

Figure 11:
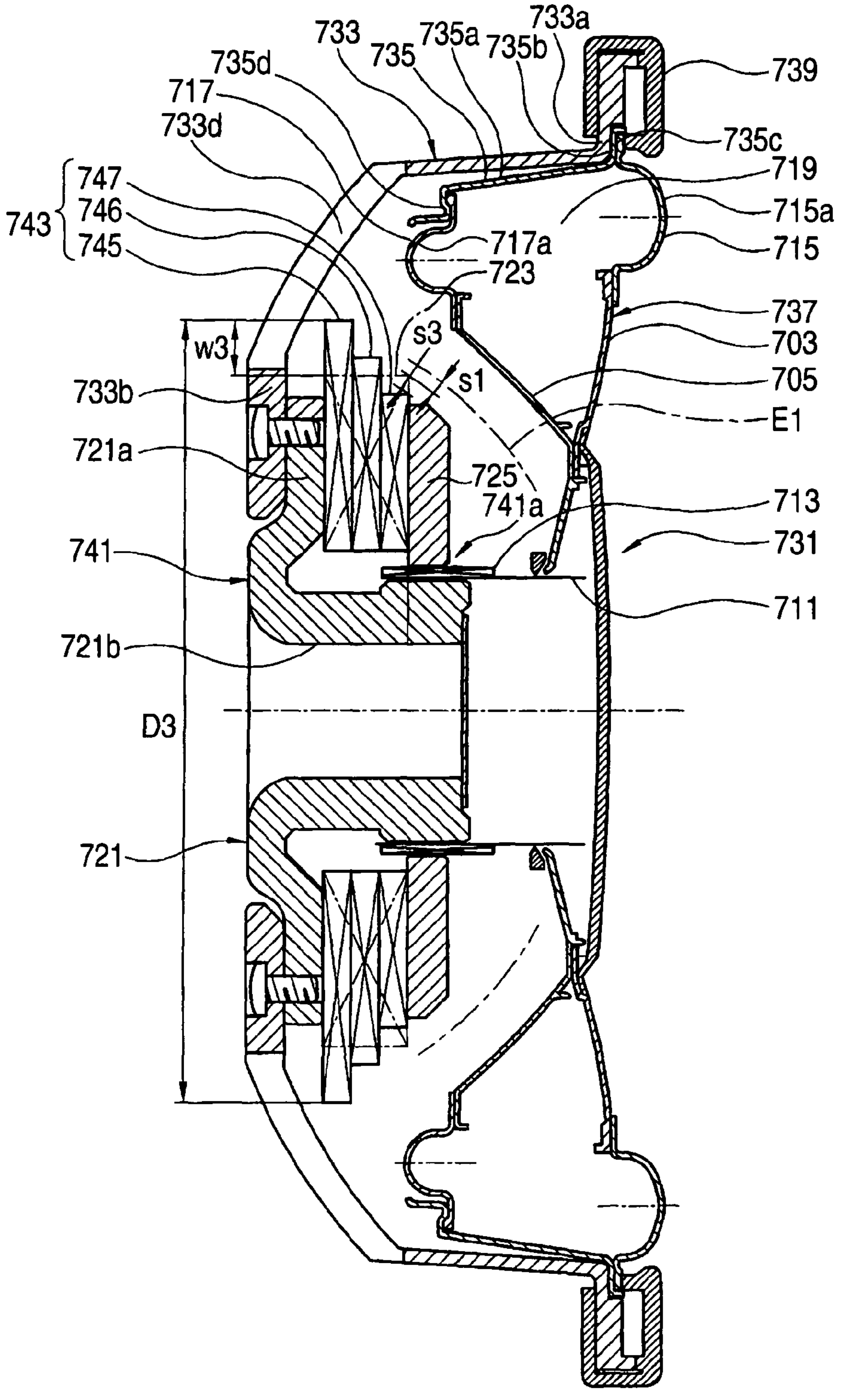
FIG. 11 is a longitudinal sectional view illustrating a configuration of a speaker apparatus according to a fourth embodiment.

FIG. 11 is a longitudinal sectional view illustrating a configuration of the speaker apparatus according to the fourth embodiment.

The speaker apparatus 731 includes a diaphragm 703, a drive cone 705 which is disposed in back of the diaphragm 703 to be concentric with the diaphragm 703 and of which the inner circumference is attached integrally to the inner circumference of the diaphragm 703, a frame 733 of which the front end is fitted with a diaphragm support 733*a* for supporting the outer circumferences of the diaphragm 703 and the drive cone 705 and in which a magnetic circuit 741 is fitted to the central axis of the rear end, and a voice coil 713 which is wound on a voice coil bobbin 711 bonded integrally to the inner circumference of the drive cone 705 and which is inserted into a magnetic gap 741*a* of the magnetic circuit 741. A space between the diaphragm 703 and the drive cone 705 forms an enclosed space 719, and a vibration system including the voice coil 713 is supported by a spring property of air contained in the enclosed space 719.

In the speaker apparatus 731, the outer circumference of the drive cone 705 is air-tightly fixed to a bracket 735 formed out of a metal plate and is fixed to the frame 733 through the bracket 735.

The bracket 735 includes a cylindrical wall portion 735*a* inserted into the inside of the diaphragm support 733*a* of the frame 733, a frame fixing portion 735*b* which extends to the outside in the diameter direction from an end of the cylindrical wall portion 735*a* and is fixed to the diaphragm support 733*a* of the frame 733, a first support 735*c* which is fitted to the end of the cylindrical wall portion 735*a* and to which the outer circumference of the diaphragm 703 is air-tightly fixed through an edge damper 715, and a second support 735*d* which is fitted to the other end of the cylindrical wall portion 735*a* and to which the outer circumference of the drive cone 705 is air-tightly fixed through an edge damper 717.

The frame fixing portion 735*b* is a flange portion extending in a collar shape to the outside in the diameter direction from the end of the cylindrical wall portion 735*a*, and the surface of the frame fixing portion 735*b* serves as the first support 735*c*.

The cylindrical wall portion 735*a* of the bracket 735 defines the space between the diaphragm 703 and the drive cone 705 as the enclosed space 719. The outer circumferences of the diaphragm 703 and the drive cone 705 are fixed to the frame 733 by fixing the frame fixing portion 735*b* of the bracket 735 to the diaphragm support 733*a*.

The frame 733 has a shallow bawl shape and the magnetic circuit 741 is attached to the inner surface of the rear end wall 733*b* in a state that a plate 721*a* of a yoke 721 is placed thereon. That is, the magnetic circuit 741 is disposed between the rear end of the frame 733 and the drive cone 705.

An opening 733*d* as a vent hole for discharging back pressure of the diaphragm is properly formed between the read end wall 733*b* of the frame 733 and the diaphragm support 733*a*. The rear surface of the diaphragm support 733*a* of the frame 733 serves as a flange surface which is closely fixed to a baffle of a speaker cabinet.

The magnetic circuit 741 fixed to the rear wall portion (bottom portion) 733*b* of the frame 733 includes a yoke 721 in which a cylindrical center pole 721*b* is protruded from the center of a disk-shaped plate 721*a*, a ring-shaped magnet 743 which is movably inserted into the outer circumference of the center pole 721*b*, and a ring-shaped top plate 725 which is movably inserted into the front end of the center pole 721*b* so that the magnet 743 is inserted between the plate 721*a* and the top plate 725.

The gap between the inner circumference of the top plate 725 and the center pole 721*b* serves as a magnetic gap 741*a* in which the voice coil 713 is disposed.

In the fourth embodiment, the magnet 743 is formed by stacking three ring-shaped unit magnets 745, 746, and 747.

The three unit magnets 745, 746, and 747 have the same inner diameter but different outer diameters, and are stacked in the order in which the outer diameter becomes smaller from the plate 721*a* to the drive cone 705.

The outer diameter D3 of the unit magnet 745 having the largest outer diameter, which is stacked on the plate 721*a*, is set as large as possible within a range which the space at the rear end of the frame 733 allows. The outer diameter of the unit magnet 747 stacked at the uppermost and close to the drive cone 705 is set so as to necessarily and sufficiently secure a distance s3 from the maximum backward displaced position E1 of the drive cone 705.

The distance s3 can be secured to be larger than the distance s1 of the magnet 123 having a rectangular section in the speaker apparatus 100 shown in FIG. 1B.

By stacking the three unit magnets 745, 746, and 747 to form the magnet 743, substantially a pentagonal outline corresponding to the shape of the housing space between the frame 733 and the drive cone 705 is obtained.

Figure 10:
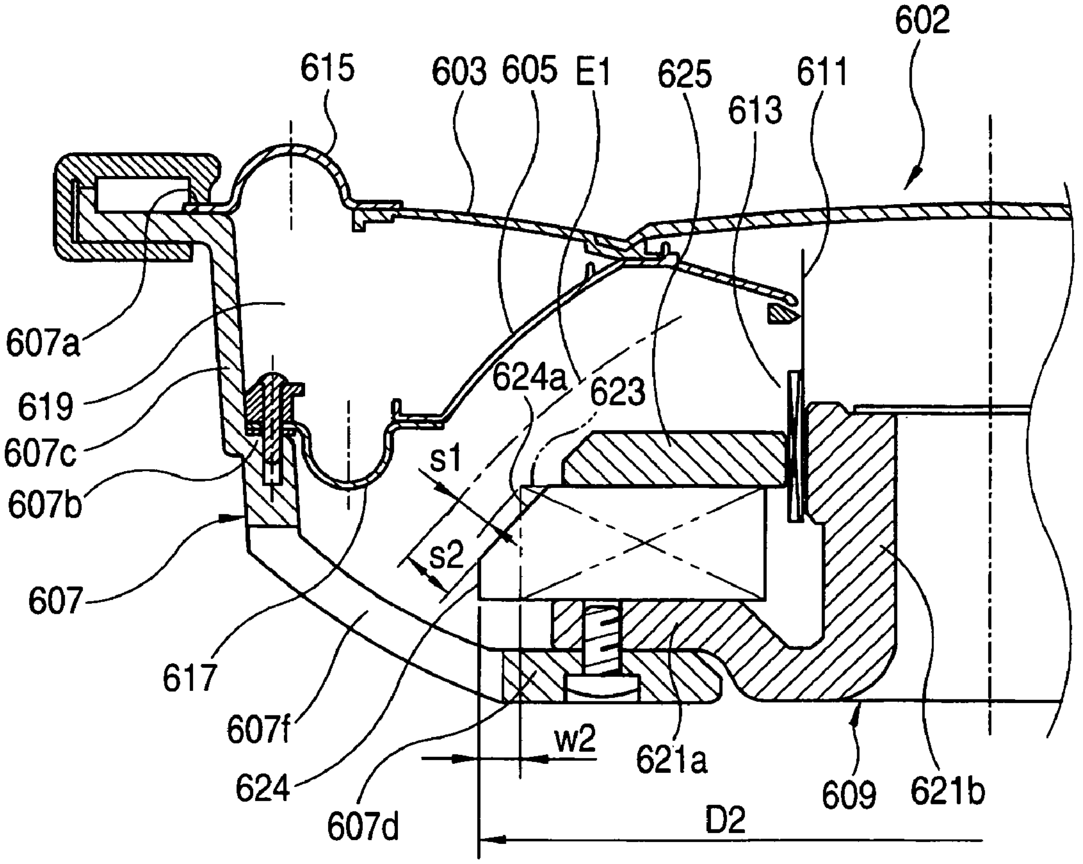
FIG. 10 is a longitudinal sectional view illustrating an improved example of the speaker apparatus shown in FIGS. 1A and 1B.

In manufacturing the speaker apparatus 731 according to the fourth embodiment, as shown in FIG. 11, a diaphragm assembly 737 in which the enclosed space 719 is defined between the diaphragm 703 and the drive cone 705 is formed by fixing the drive cone 705 to the bracket 735. When no defect is checked as an inspection result of air tightness or a spring property of the enclosed space 719 in the diaphragm assembly 737, the diaphragm assembly 737 is fitted into the frame 733 to which the magnetic circuit 741 and the like has been fitted. When the attachment of the voice coil bobbin 711 to the drive cone 705 in the enclosed space 719 is finished, as shown in FIG. 10, a dust cap 727 is attached to the central opening of the diaphragm 703 to prevent dust from invading the magnetic gap 741*a*.

The contact surfaces of the frame fixing portion 735*b* of the bracket 735 and the diaphragm support 733*a* are bonded to each other by the use of a double-sided adhesive tape or an adhesive which is not cured, thereby fixing the frame 733 and the bracket 735 to each other.

Packing 739 serves as a packing material for attaching a speaker to a cabinet and forms an appearance as seen from the front side. The packing 739 has a substantially "C" shape surrounding the contact portions between the frame fixing portion 735*b* and the diaphragm support 733*a*, thereby enhancing the air tightness of the contact portions.

The packing 739 comes in close contact with the baffle of the speaker cabinet, thereby enhancing the air tightness with the baffle and blocking the delivery of unnecessary vibration between the baffle and the speaker apparatus.

The speaker apparatus 731 described above is a speaker apparatus in which the space between the diaphragm 703 and the drive cone 705 disposed concentrically is the enclosed space 719 and the voice coil 713 is supported by the spring property of air contained in the enclosed space 719, wherein the magnet 743 of the magnetic circuit 741 disposed in back of the drive cone 705 is formed by stacking a plurality of unit magnets 745, 746, and 747 so that the unit magnet 747 having the smallest outer diameter is disposed close to the drive cone 705, thereby forming an outline having a pentagonal section substantially equivalent to the shape obtained by chamfering the corner close to the drive cone 705, as a whole.

That is, by disposing the unit magnet 747 having the smallest outer diameter close to the drive cone 705, it is possible to easily secure the distance s3 from the maximum backward displaced position El of the drive cone 705. In addition, by using the unit magnet having the outer diameter D3 larger by the size w3 than the related-art magnet 123 having a rectangular section as the unit magnet disposed at the rear end of the frame 733, it is possible to effectively utilize the empty space in the frame 733 and thus to embody the increase in diameter of the magnet which is advantageous for enhancement in magnetic flux density.

In addition, since the unit magnets 745, 746, and 747 to be stacked can have a ring shape of a simple rectangular section without requiring a process of chamfering the cone, the increase in cost for the chamfering process does not occur practically.

Accordingly, it is possible to enhance the speaker performance by increasing the outer diameter of the magnet 743 of the magnetic circuit 741 without increasing cost.

By changing the number of unit magnets 745, 746, and 747 to be stacked or the like, it is possible to flexibly cope with the change in outline of the magnet 743 accompanied with the change in shape of the drive cone 705, and thus it is possible to avoid the new manufacturing of a magnet having a different shape. Accordingly, it is possible to easily cope with the change in specification of the diaphragm without cost.

Since the speaker apparatus 731 according to the fourth embodiment is a speaker apparatus 731 in which the space between the diaphragm 703 and the drive cone 705 disposed concentrically is the enclosed space 719 and the voice coil 713 is supported by the spring property of air contained in the enclosed space 719, it is not necessary to provide a specific damper for controlling the vibration of the voice coil bobbin 711 or the diaphragm 703.

Accordingly, the axial size of the speaker apparatus 731 is reduced due to omission of the specific damper and the installation space thereof, and it is thus possible to reduce the thickness of the speaker apparatus, which is required for a car audio system or the like.

Since the drive cone 705 can be made of the same material as the diaphragm 703, the weight is smaller and the mechanical fatigue is less generated, in comparison with the related-art bellows-shaped damper. Accordingly, it is possible to prevent deterioration in damping ability due to the mechanical fatigue of the constituent elements, thereby elongating the life time of the speaker apparatus 731. In addition, since large deformation is not locally generated, singular vibration or frictional sound making sound quality muddy does not occur. Accordingly, it is possible to reproduce sound with high quality without muddiness.

In the speaker apparatus 731 according to the fourth embodiment, by fitting the drive cone 705 to the bracket 735, the diaphragm assembly 737 is obtained in which the space between the diaphragm 703 and the drive cone 705 is the enclosed space 719. Before attaching the diaphragm assembly 737 to the frame 733, it is possible to detect any defect in the enclosed space 719. When a correctable defect is detected, the correction work can be performed with the small and light state before attaching the diaphragm assembly to the frame 733. Accordingly, it is possible to easily correct the enclosed space 719.

Even when a non-correctable defect occurs in the enclosed space 719, only the diaphragm 703, the drive cone 705, and the bracket 735 can be disused, regardless of the constituent elements such as the magnetic circuit 741 built in the frame 733. Accordingly, compared with the configuration shown in FIG. 1B in which the outer circumferences of the diaphragm 703 and the drive cone 705 are bonded directly to the frame, it is possible to suppress the disuse cost and thus to reduce the economical loss.

As a method of manufacturing the speaker apparatus 731 according to the fourth embodiment, as described above, a manufacturing method of first forming the diaphragm assembly 737 and then fitting the diaphragm assembly 737 into the frame 733 to which the magnetic circuit 741 and the like have been fitted can be employed.

In this manufacturing method, since the diaphragm support 733*a* fitted to the frame 733 requires only one place to which the bracket 735 of the diaphragm assembly 737 is fixed, it is not necessary to individually provide the diaphragm supports for the diaphragms. That is, since the number of places on the frame 733 to which the diaphragm supports 733*a* would be fixed decreases, it is possible to reduce the cost for processing the frame 733 which is a relatively large component and thus to reduce the production cost.

In addition, since the number of places for the diaphragm support 733*a* is one, the gap between the rear end wall 733*b* of the frame 733 and the diaphragm support 733*a* is enlarged. Accordingly, by enlarging the opening 733*d* as a vent hole formed in the gap, it is possible to reduce the weight of the speaker apparatus.

In the speaker apparatus 731 according to the fourth embodiment, since the packing 739 for bringing the diaphragm support 733*a* of the frame 733 and the frame support 735*b* of the bracket 735 into close contact with each other is made of a vibration absorbing material such as rubber, the vibration delivered between the frame 733 and the bracket 735 is blocked. Accordingly, the unnecessary vibration from the magnetic circuit 741 does not affect the diaphragm, thereby improving the acoustic characteristic or the reproducibility.

In the fourth embodiment, a roll portion 715*a* allowing the amplitude of the diaphragm 703 is protruded toward the front side of the diaphragm from the edge damper 715. A roll portion 717*a* allowing the amplitude of the drive cone 705 is protruded toward the rear side of the diaphragm from the edge damper 717. By setting the directions of the roll portions 715*a* and 717*a* in this way, the volume of the enclosed space 719 can be secured as large as possible. However, if only a damper property necessary as an air cushion is obtained, the directions of the roll portions 715*a* and 717*a* are not limited to those of the embodiment. For example, the directions of the roll portions 715*a* and 717*a* may be set opposite to those of the embodiment.

According to the fourth embodiment, the number of unit magnets constituting the magnet or the outer diameter of the respective unit magnets is not limited to the examples of the embodiment described above.

The number of unit magnets to be stacked may be set to a proper number of 2 or more. In addition, all the unit magnets may not have outer diameters different from each other. For example, the unit magnets having the same outer diameter may be stacked partially.

As described above in detail, the speaker apparatus 731 according to the fourth embodiment includes the diaphragm 703, the drive cone 705 which is disposed in back of the diaphragm 703 to be concentric with the diaphragm 703 and of which the inner circumference is attached integrally to the inner circumference of the diaphragm 703, the frame 733 of which the front end is fitted with the diaphragm support 733*a* for supporting the outer circumferences of the diaphragm 703 and the drive corn 705, the magnetic circuit 741 which is disposed between the rear end of the frame 733 and the drive cone 705 so as to drive the diaphragm 703, and the voice coil 713 which is wound on the voice coil bobbin 711 bonded integrally to the inner circumference of the drive cone 705 and which is inserted into the magnetic gap 741*a* of the magnetic circuit 741, in which the space between the diaphragm 703 and the drive cone 705 is the enclosed space 719 and the vibration system including the voice coil 713 is supported by the spring property of air contained in the enclosed space 719. Here, the ring-shaped magnet 743 of the magnetic circuit 741 is formed by stacking a plurality of unit magnets 745 to 747 and an outline corresponding to the shape of the housing space between the frame 733 and the drive cone 705 is given by using two or more kinds of unit magnets having different outer diameters as the plurality of unit magnets 745 to 747.

In this way, the magnet 743 of the magnetic circuit 741 disposed in back of the drive cone 705 has a structure. in which a plurality of unit magnets 745 to 747 is stacked so that the unit magnet having the smallest outer diameter is disposed close to the drive cone 705. Accordingly, it is possible to form an outline having a pentagonal section substantially equivalent to the shape obtained by chamfering the cone close to the drive cone 705, as a whole.

That is, by disposing the unit magnet having the smallest outer diameter close to the drive cone, it is possible to easily secure the distance s3 from the maximum backward displaced position E1 of the drive cone 705. In addition, by using the unit magnet having the largest outer diameter as the unit magnet disposed close to the rear end of the frame, it is possible to effectively utilize the empty space in the frame and thus to embody the increase in diameter of the magnet 743 which is advantageous for enhancement in magnetic flux density.

In addition, since the unit magnets to be stacked can have a ring shape of a simple rectangular section without requiring a process of chamfering the corner, the increase in cost for the chamfering process does not occur practically.

Accordingly, it is possible to enhance the speaker performance by increasing the outer diameter of the magnet 743 of the magnetic circuit 741 without increasing cost.

By changing the number of unit magnets to be stacked or the like, it is possible to flexibly cope with the change in outline of the magnet 743 accompanied with the change in shape of the drive cone 705, and thus it is possible to avoid the new manufacturing of a magnet having a different shape. Accordingly, it is possible to easily cope with the change in specification of the diaphragm without cost.

The drive cone 705 is not limited to the shape described in the fourth embodiment, but may have any shape if only it can deliver the drive power of the voice coil 713 to the diaphragm 703.

Hereinafter, an example of a diaphragm-reinforced speaker apparatus according to a fifth embodiment of the present invention will be described in detail with reference to the drawings.

Figure 13A:
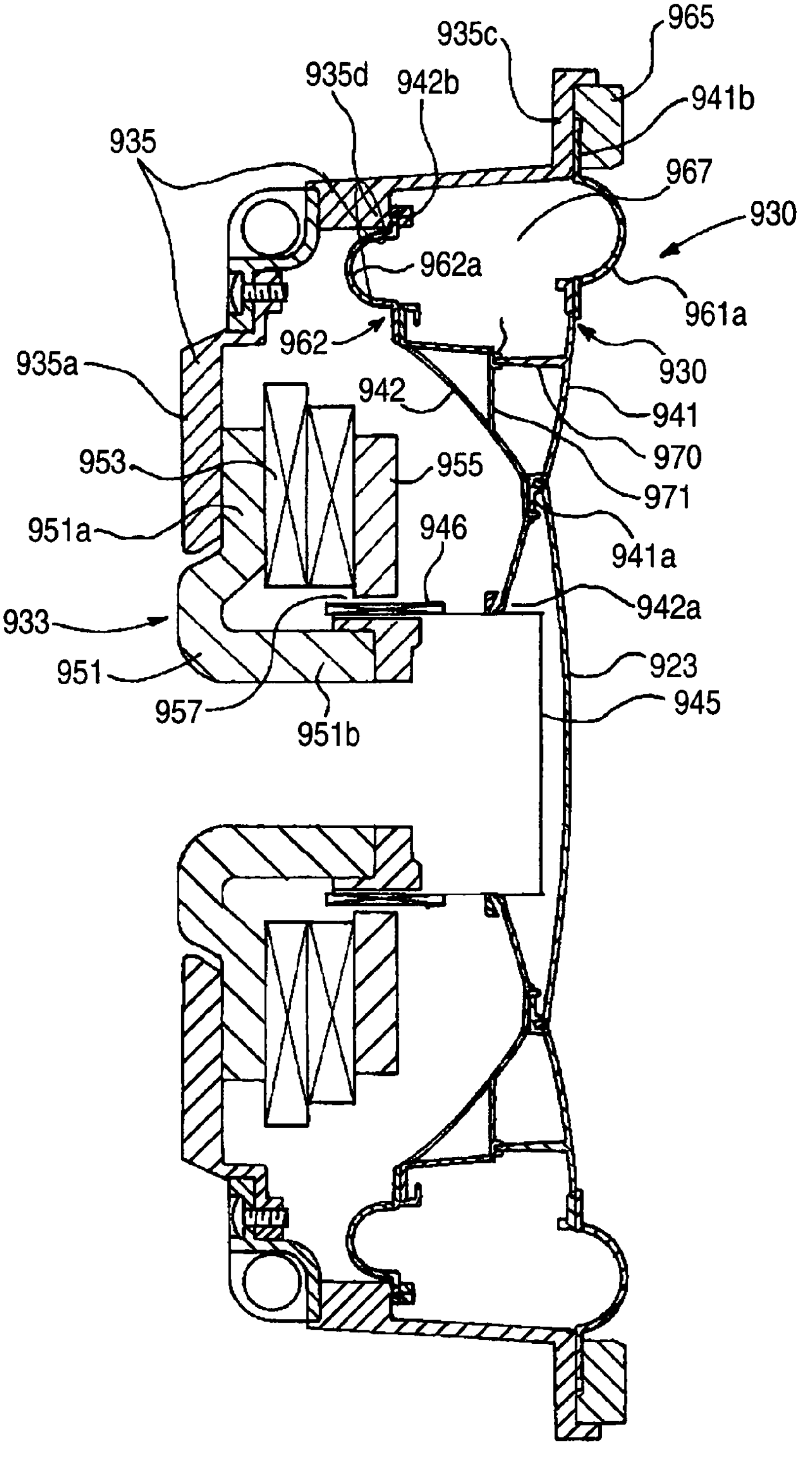
FIGS. 13A and 13B are a partially longitudinal sectional view and a front view illustrating a structure of a diaphragm-reinforced speaker apparatus according to a fifth embodiment.
Figure 13B:
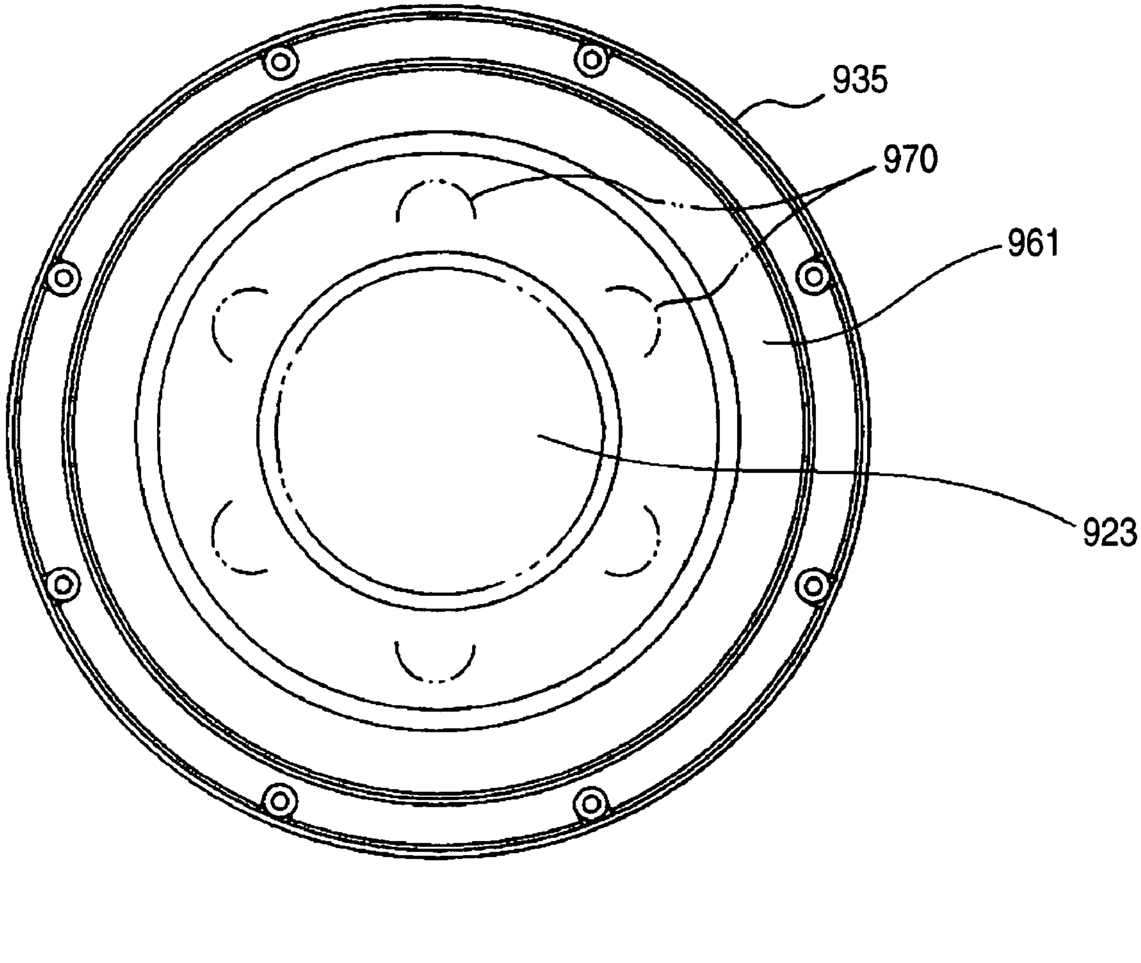

FIGS. 13A and 13B illustrate the diaphragm-reinforced speaker apparatus according to the fifth embodiment, where FIG. 13A is a longitudinal sectional view of the speaker apparatus and FIG. 13B is a plan view illustrating the front surface of the speaker apparatus.

As shown in FIG. 13A, the speaker apparatus 930 according to the fifth embodiment includes a magnetic circuit 933, a frame 935 in which the magnetic circuit 933 is attached to the rear inner wall thereof, a diaphragm 941 and a drive cone 942 concentrically disposed in the driving direction, the drive cone serving to deliver the drive power of a voice coil 946 to the diaphragm 941, the voice coil 946 wound on a cylindrical voice coil bobbin 945, and a plurality of semi-circular connection pieces 970 for connecting the diaphragm 941 and the drive cone 942 to each other in an enclosed space 967 surrounded with the diaphragm 941, the drive cone 942, and the frame 935.

The magnetic circuit 933 includes a yoke 951 in which a cylindrical center pole 951*b* is protruded from the center of a disk-shaped plate 951*a*, a ring-shaped magnet 953 which is movably inserted into the outer circumference of the center pole 951*b*, and a ring-shaped top plate 955 which is movably inserted into the front end of the center pole 951*b* so that the magnet 953 is inserted between the plate 951*a* and the top plate 955. The gap between the inner circumference of the top plate 955 and the center pole 951*b* serves as a magnetic gap 957 in which the voice coil 946 is disposed.

The frame 935 has a shallow bawl shape and the magnetic circuit 933 is attached to the inner surface of the bottom portion 935*a* in a state that the plate 951*a* of the yoke 951 is placed thereon.

The frame 935 is fitted with a diaphragm support 935*c* for the diaphragm 941 and a diaphragm support 935d for the drive cone 942, which are spaced apart from each other in the driving direction.

The diaphragm 941 and the drive cone 942 are cone-shaped diaphragms. The edges 961 and 962 as the outer circumferences thereof are fixed to the diaphragm supports 935*c* and 935*d* of the frame 935 and the inner circumferences 941*a* and 942*a* thereof are bonded to each other and fixed to the voice coil bobbin 945.

The edges 961 and 962 are preferably made of members of a material having low internal loss so as to damp the vibration delivered from a diaphragm as a diaphragm body. Accordingly, it is preferable that members of a material (material having internal loss greater than that of the diaphragm) different from the diaphragm are bonded to each other and used as the edges 961 and 962.

The diaphragm 941 disposed on the front side of the speaker apparatus has a central opening with a diameter greater than that of the opening of the drive cone 942, and a bulging portion 961*a* bulging externally (toward the front side of the speaker apparatus) from the enclosed space 967 between the diaphragms is provided in the edge 961.

The drive cone 942 disposed in back of the diaphragm 941 has a central opening with a diameter substantially equal to the outer diameter of the voice coil bobbin 945, and a bulging portion 962*a* bulging externally (toward the rear side of the speaker apparatus) from the enclosed space 967 between the diaphragms is provided in the edge 962.

The outer circumferences 941*b* and 942*b* of the edges 961 and 962 of the diaphragm 941 and the drive cone 942 are fixed to two diaphragm supports 935*c* and 935*d* of the frame 935, respectively.

An attachment flange 961*b* extending from the outer circumference of the edge 961 of the diaphragm 941 is inserted between a gasket 965 and the diaphragm support 935*c* and is fixed to the diaphragm support 935*c*.

The inner circumference 941a of the diaphragm 941 is attached to the drive cone 942 in a state that it overlaps with the drive cone 942 located in back thereof.

A dust cap 923 is attached to the center of the diaphragm 941. The dust cap 923 covers the front side of the voice coil bobbin 945 and serves to prevent dust from invading the magnetic gap 957.

By properly bonding and fixing the inner circumference 942*a* of the drive cone 942 to the outer circumference of the voice coil bobbin 545 with an adhesive, such a structure that the inner circumferences 941*a* and 942*a* of the diaphragm

941 and the drive cone 942 are bonded to each other and are fixed to the voice coil bobbin 945 is obtained.

The cylindrical voice coil bobbin 945 is inserted into the outer circumference of the center pole 951*b* to be axially movable, and is positioned in the radius direction and the axial direction by the drive cone 942 attached to the outer circumference thereof.

A basement 971 (only a reinforcing connection portion) formed by bending a plate member in an L shape is fixed to the curved drive cone 942 in the enclosed space 967. The front surface (the front surface of the speaker apparatus) of the basement 971 forms a flat plane substantially perpendicular to the center line of the speaker apparatus 930 and is substantially parallel to the inner surface of the diaphragm 941 facing this portion.

In the portion facing the basement 971, a connection piece 970 having a semicircle shape (see FIG. 12B) as seen from the front side extends from the inner surface of the diaphragm 941 to be perpendicular to the inner surface, and the end 970*a* thereof is fixed to the basement 971. A plurality of connection pieces 970 is disposed properly around the center of the diaphragm with a predetermined interval, and preferably with a constant interval. The connection pieces 970 may be made of the same material as the diaphragm 941.

Since the diaphragm 941 and the drive cone 942 are connected and reinforced through the basement 971 by the semicircular connection piece 970, the rigidity of the diaphragm 941 and the drive cone 942 forming the enclosed space 967 can be increased and the propagation speed of acoustic vibration can be enhanced, thereby reproducing sound with high quality.

By the connection using the connection pieces 970, the vibration energy is rapidly and widely diffused into the diaphragm 941 and the drive cone 942 and local distortion of the diaphragm is suppressed. Accordingly, the burden of the vibration energy to be absorbed can be reduced and fatigue resistance of the diaphragm 941 and the drive cone 942 can be improved.

Here, as a difference in vibration area between the diaphragm 541 and the drive cone 542 becomes smaller and the volume of the enclosed space 567 becomes larger, the air spring becomes smoother. In the fifth embodiment, when it is assumed that the difference between an effective area of the diaphragm 541 and an effective area of the drive cone 542 is ΔS and the volume of the enclosed space 567 is V, the hardness of the spring, that is, the stiffness of the spring constant indicating the spring property of the air spring, is proportional to ΔS/V.

Figure 12A:
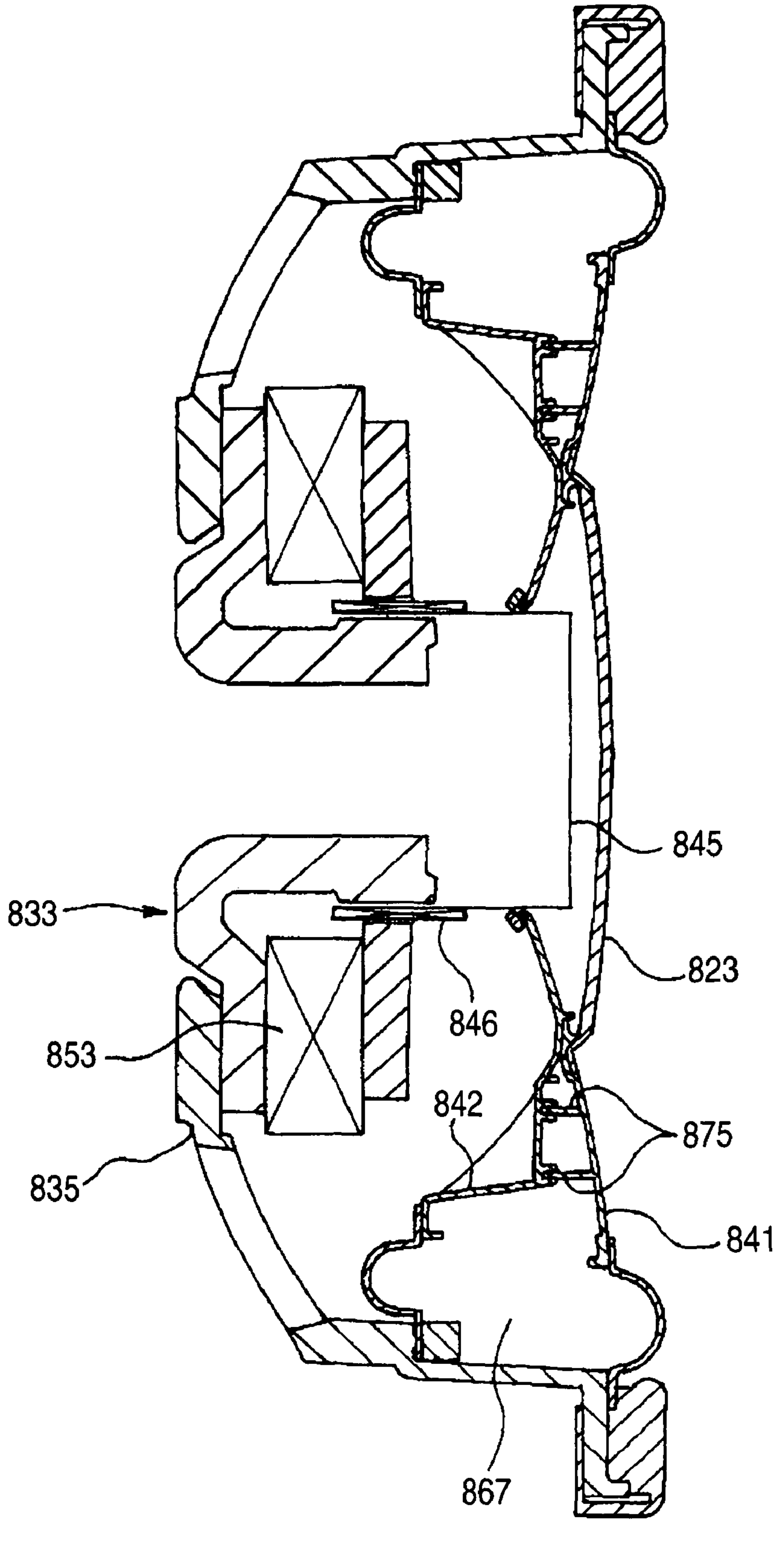
FIGS. 12A and 12B are a partially longitudinal sectional view and a front view illustrating a structure of a related-art speaker apparatus, respectively.
Figure 12B:
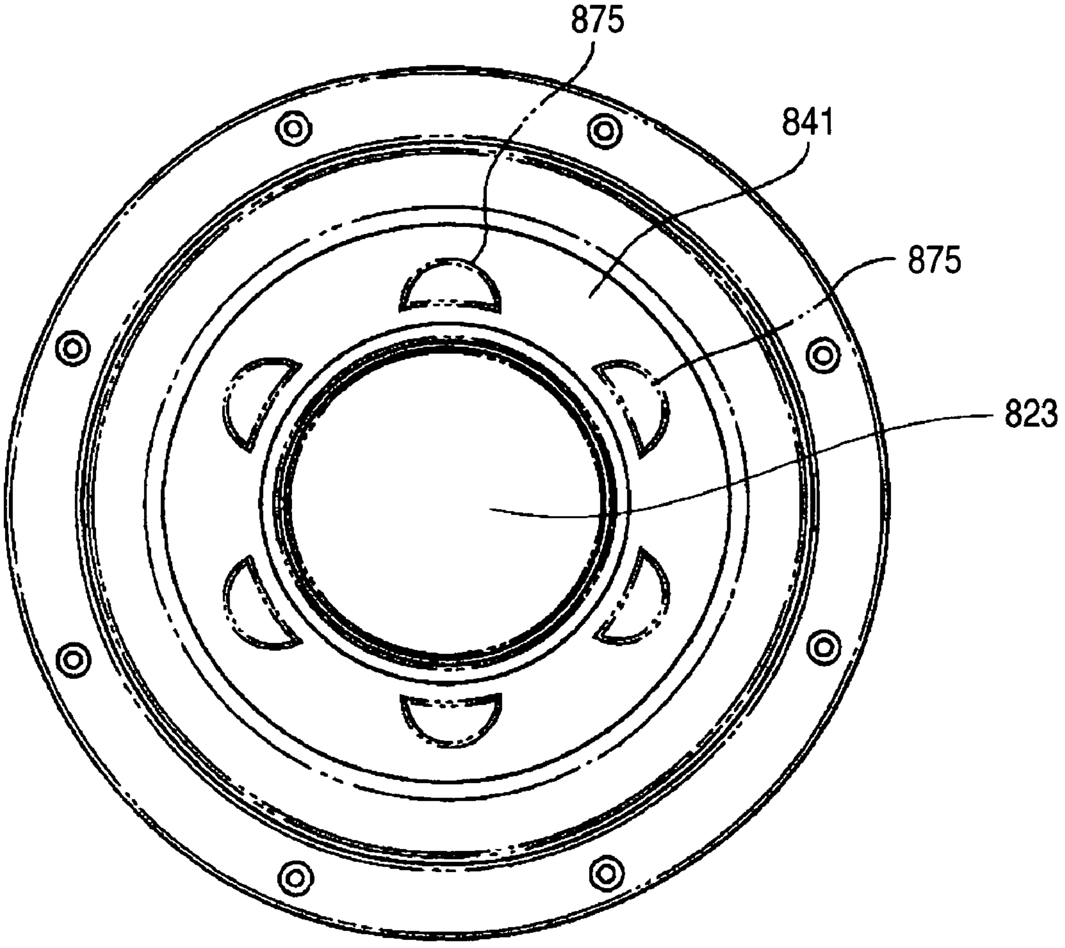
Figure 17:
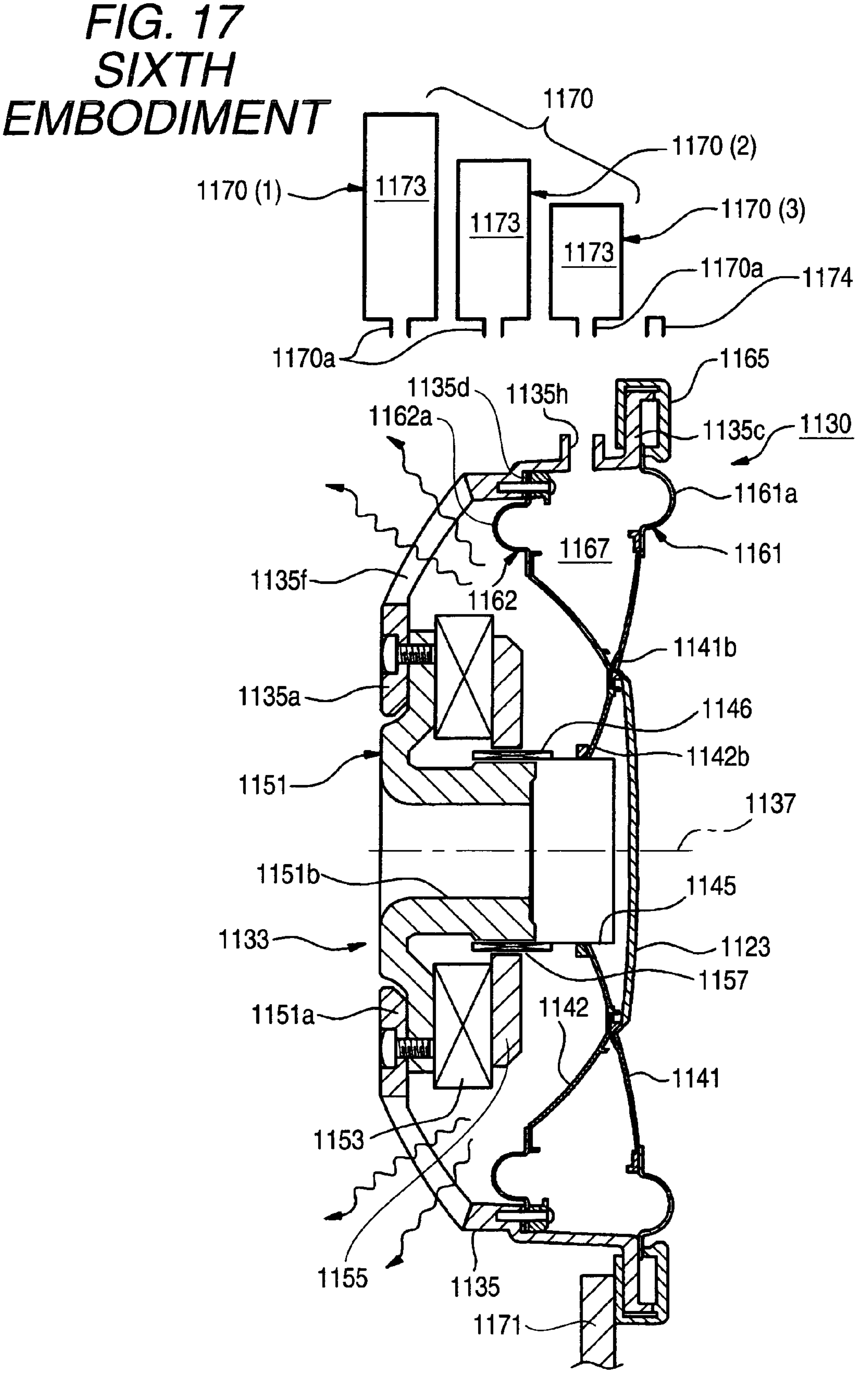
FIG. 17 is a longitudinal sectional view illustrating a structure of a frequency variable speaker apparatus according to a sixth embodiment of the present invention.

FIG. 17 is a graph illustrating a relation between the volume V of the enclosed space 967 and the lowest resonant frequency $f_0$ and shows measured values of Example SP1 (an example of the diaphragm-reinforced speaker apparatus according to the fifth embodiment shown in FIGS. 13A and 13B) and Related-art Example SP2 (an example of the related-art damperless speaker apparatus shown in FIGS. 12A and 12B).

In the diaphragm-reinforced speaker apparatus according to the fifth embodiment, since the volume V of the enclosed space 967 is greater than that of the related-art damperless speaker apparatus, the stiffness becomes smaller. Accordingly, it is possible to the lowest resonant frequency f0 as shown in the graph of FIG. 4 and thus to suppress the deterioration in low-frequency reproducibility of reproduced sound.

Although it has been described in the fifth embodiment described above that the connection pieces 970 have a semicircle shape as seen from the front side, that is, a half cylinder shape, the shape of the connection pieces 970 is not limited to the shape described above, but may be any shape such as a crescent shape shown in a transverse section of FIG. 14A, a mountain shape shown in FIG. 14B, an L shape shown in FIG. 14C, and a "⊃" shape shown in FIG. 14D. In all of them, since one side is opened and a concave portion of the connection pieces 970 communicates directly with the enclosed space 967, the reduction in volume of the enclosed space 967 due to the connection pieces 970 is suppressed and it is thus possible to take the enclosed space 967 as large as possible. In addition, the spring constant of the air spring in the enclosed space 967 becomes smaller, thereby reducing the lowest resonant frequency $f_0$. Since the transverse sections of the non-ring-shaped connection pieces 970 has a circular arc shape or a bent shape, the reinforcement ability is higher than a flat reinforcing plate, thereby securing excellent rigidity of the diaphragm.

When the diaphragm 941 and the drive cone 942 are driven due to axial displacement of the voice coil bobbin 945, the air such as air contained in the enclosed space 967 between the diaphragms 941 and 942 is compressed due to the displacement of the diaphragm 941 and the drive cone 9542 and the displacement of edges 961 and 962, thereby exhibiting the spring property as the air spring. The voice coil bobbin 945 can be controllably supported by the spring of the edges 961 and 962 and the air spring regulated by the volume of the enclosed space 967.

Figure 16:
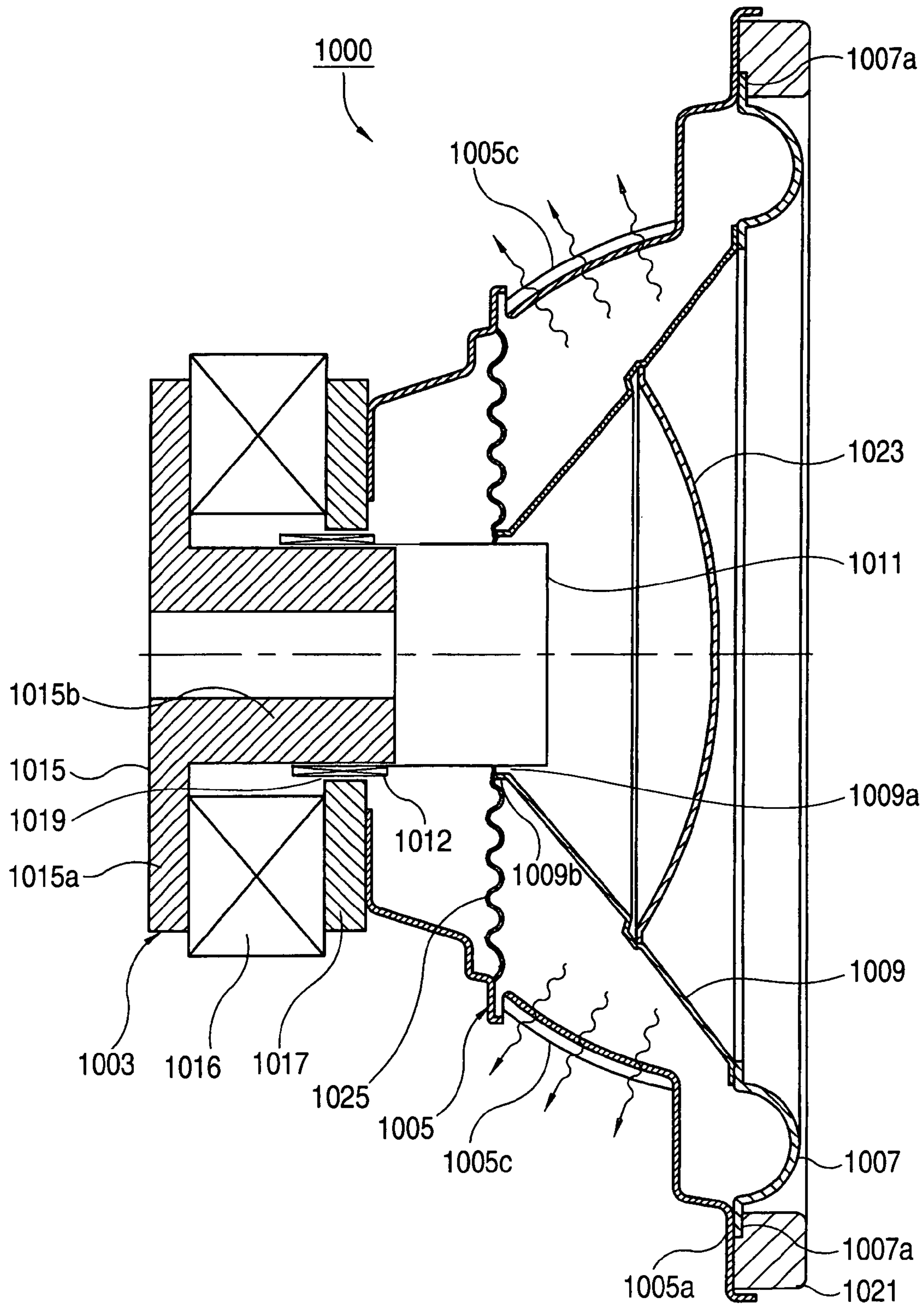
FIG. 16 is a longitudinal sectional view illustrating a structure of a related-art speaker apparatus.

In the speaker apparatus 930 according to the fifth embodiment, the diaphragm 941 and the drive cone 942 also serve as a damper having a vibration control function, and the spring property as an air spring of the enclosed space 967 between the diaphragms absorbs the vibration energy of the voice coil bobbin 945, the diaphragm 941, and the drive cone 942 to control the voice coil bobbin 945, the diaphragm 941, and the drive cone 942. Accordingly, it is not necessary to provide a control damper which was provided in the related-art speaker apparatus shown in FIG. 16. As a result, the axial size of the speaker apparatus is reduced due to omission of the damper and the installation space thereof, and it is thus possible to reduce the thickness of the speaker apparatus 930, which is required for a car audio system or the like.

Since the drive cone 942 disposed concentrically in back of the diaphragm 941 so as to form the enclosed space 967 between the diaphragms may be made of the same material as the diaphragm 941 and the mechanical fatigue is less generated in comparison with the related-art bellows-shaped damper, it is possible to prevent deterioration in damping ability due to the mechanical fatigue of the constituent elements, thereby elongating the life time of the speaker apparatus.

Unlike the related-art bellows-shaped damper in which deformation is moved between the bellows adjacent to each other at the time of propagation of vibration, since large deformation is not locally generated in the diaphragm 941 and the drive cone 942, singular vibration or frictional sound making sound quality muddy does not occur. Accordingly, it is possible to reproduce sound with high quality without muddiness.

In the speaker apparatus 930 according to the fifth embodiment, the edge 961 of the diaphragm 941 and the edge 962 of the drive cone 942 become more resistant to deformation due to back pressure with help of the air pressure in the enclosed space 967 between the diaphragms. In addition, since the drive cone 942 and the edge 962 thereof take charge of the back pressure, the back pressure acting on the diaphragm 941 serving to reproduce sound is reduced, thereby improving the quality of reproduced sound.

As described above in detail, the diaphragm-reinforced speaker apparatus 930 according to the fifth embodiment includes the diaphragm 941 and the drive corn 942 disposed in the driving direction, wherein the outer circumferences 941*b* and 942*b* of the diaphragm 941 and the drive cone 942 are fixed to the diaphragm supports 935*c* and 935*d* of the frame 935, the space surrounded with the diaphragm 941, the drive cone 942, and the frame 935 forms the enclosed space 967, the diaphragm 941 and the drive conen 942 are connected to each other through the non-ring-shaped connection pieces 970 in the enclosed space 967, and the vibration system is supported through the voice coil bobbin 945 by the spring property of the air in the enclosed space 967.

In this way, since the reinforcing member for securing the rigidity of the diaphragm 941 and the drive cone 942 is formed out of a non-ring-shaped curved piece or a bent piece, the reduction in volume of the enclosed space is not caused like the ring-shaped enclosed reinforcing member, but it is possible to suppress the reduction in volume of the enclosed space 967 as much as possible, thereby suppressing the increase of the lowest resonant frequency $f_0$ as much as possible. Since the spring property of the air spring in the enclosed space 967 between the diaphragm 941 and the drive cone 942 controls the vibration of the voice coil bobbin 945, the diaphragm 941, and the drive cone 942, it is not necessary to provide a specific damper for control. The axial size of the speaker apparatus 930 is reduced due to the exclusion of the damper and the installation space thereof, and it is thus possible to reduce the thickness of the speaker apparatus, which is required for a car audio system or the like.

Since the drive cone 942 can be made of the same material as the diaphragm 941, the weight is smaller and the mechanical fatigue is less generated, in comparison with the related-art bellows-shaped damper. Accordingly, it is possible to prevent deterioration in damping ability due to the mechanical fatigue of the constituent elements, thereby elongating the life time of the speaker apparatus. In addition, since large deformation is not locally generated, singular vibration or frictional sound making sound quality muddy does not occur. Accordingly, it is possible to reproduce sound with high quality without muddiness.

The drive cone 942 is not limited to the shape of the fifth embodiment, but may have any shape if only it can deliver the drive power of the voice coil 946 to the diaphragm 941.

Hereinafter, a frequency variable speaker apparatus according to a sixth embodiment of the present invention will be described in detail with reference to the drawings.

FIG. 17 is a longitudinal sectional view of the frequency variable speaker apparatus according to the sixth embodiment. As shown in FIG. 17, the speaker apparatus 1130 includes a magnetic circuit 1133, a frame 1135 attached to the rear inner wall of the magnetic circuit 1133, a diaphragm 1141 and a drive cone 1142 disposed concentrically in the driving direction, the drive cone serving to deliver a drive power of a voice coil to the diaphragm 1141, a voice coil 1146 wound on a cylindrical voice coil bobbin 1145, and an enclosed hollow attachment 1170 which is detachably attached to the frame 1135 and which communicates with an enclosed space between the diaphragm 1141 and the drive cone 1142. Reference numeral 1137 denotes a center line of the speaker apparatus 1130.

The magnetic circuit 1133 includes a yoke 1151 in which a cylindrical center pole 1151*b* is protruded from the center of a disk-shaped plate 1151*a*, a ring-shaped magnet 1153 which is movably inserted into the outer circumference of the center pole 1151*b*, and a ring-shaped top plate 1155 which is movably inserted into the front end of the center pole 1151*b* so that the magnet 1153 is inserted between the plate 1151*a* and the top plate 1155. The gap between the inner circumference of the top plate 1155 and the center pole 1151*b* serves as a magnetic gap 1157 in which the voice coil 1146 is disposed.

The frame 1135 has a shallow bawl shape and the magnetic circuit 1133 is attached to the inner surface of the bottom portion 1135*a* in a state that the plate 1151*a* of the yoke 1151 is placed thereon. The frame 1135 is fitted with a diaphragm support 1135*c* for the diaphragm 1141 and a diaphragm support 1135*d* for the drive cone 1142, which are spaced apart from each other in the driving direction.

An opening 1135*f* as a vent hole for discharging back pressure of the diaphragm is properly formed between the two diaphragm supports 1135*c* and 1135*d* and the bottom portion 1135*a*. The rear surface of the diaphragm support 1135*c* of the frame 1135 serves as a flange surface which is closely fixed to a baffle 1171 of a speaker cabinet.

The diaphragm 1141 and the drive cone 1142 are cone-shaped diaphragms. The edges 1161 and 1162 as the outer circumferences thereof are fixed to the diaphragm supports 1135*c* and 1135*d* of the frame 1135 and the inner circumferences 1141*b* and 1142*b* thereof are bonded to each other and fixed to the voice coil bobbin 1145.

The edges 1161 and 1162 are preferably made of members of a material having low internal loss so as to damp the vibration delivered from a diaphragm as a diaphragm body. Accordingly, it is preferable that members of a material (material having internal loss greater than that of the diaphragm) different from the diaphragm are bonded to each other and used as the edges 1161 and 1162.

The diaphragm 1141 disposed on the front side of the speaker apparatus has a central opening with a diameter greater than that of the opening of the drive cone 1142, and a bulging portion 1161*a* bulging externally (toward the front side of the speaker apparatus) from the enclosed space 1167 between the diaphragms is provided in the edge 1161.

The drive cone 1142 disposed in back of the diaphragm 1141 has a central opening with a diameter substantially equal to the outer diameter of the voice coil bobbin 1145, and a bulging portion 1162*a* bulging externally (toward the rear side of the speaker apparatus) from the enclosed space 1167 between the diaphragms is provided in the edge 1162.

The bulging directions of the bulging portions 1161*a* and 1162*a* are not limited to the direction shown in FIG. 17.

The edges 1161 and 1162 of the diaphragm 1141 and the drive cone 1142 are fixed to two diaphragm supports 1135*c* and 1135*d* of the frame 1135, respectively.

An attachment flange 1161*b* extending from the outer circumference of the edge 1161 of the diaphragm 1141 is inserted between a gasket 1165 and the diaphragm support 1135*c* and is fixed to the diaphragm support 1135*c*.

The inner circumference 1141*b* of the diaphragm 1141 is attached to the drive cone 1142 in a state that it overlaps with the drive cone 1142 located in back thereof.

A dust cap 1123 is attached to the center of the diaphragm 1141. The dust cap 1123 covers the front side of the voice coil bobbin 1145 to prevent dust from invading the magnetic gap 1157.

By properly bonding and fixing the inner circumference 1142*b* of the drive cone 1142 to the outer circumference of the voice coil bobbin 1145 with an adhesive, such a structure that the inner circumferences 1141*b* and 1142*b* of the diaphragm 1141 and the drive cone 1142 are bonded to each other and are fixed to the voice coil bobbin 1145 is obtained.

The cylindrical voice coil bobbin 1145 is inserted into the outer circumference of the center pole 1151*b* to be axially movable, and is positioned in the radial direction and the axial direction by the drive cone 1142 attached to the outer circumference thereof.

The area surrounded with the diaphragm 1141, the drive cone 1142, and the frame 1135 forms a main air spring space (enclosed space) 1167. A fitting tag 1135*h* to which an enclosed hollow attachment 1170 to be described later is fitted is formed on the side portion of the frame 1135 defining the main air spring space. The main air spring space 1167 other than the portion of the fitting tag 1135*h* forms an air-tight space.

In the sixth embodiment, as shown in FIG. 17, the enclosed hollow attachment 1170 has a rectangular box shape, and a fitting tag 1170*a* which is air-tightly and detachably fitted to the fitting tag 1135*h* of the frame 1135 is formed on the side portion thereof. The inside of the enclosed hollow attachment 1170 other than the portion of the fitting tag 1170*a* forms an air-tight space, and the air-tight space serves as a secondary air spring space. In the state that the enclosed hollow attachment 1170 is fitted to the frame 1135, the main air spring space 1167 between the diaphragm 1141 and the drive cone 1142 and the secondary air spring space 1173 in the enclosed hollow attachment 1170 are merged, thereby forming an entire enclosed air spring space of the speaker apparatus.

When the diaphragm 1141 and the drive cone 1142 are driven due to axial displacement of the voice coil bobbin 1145, as shown in the figure, the air such as air contained in the enclosed space between the diaphragms 1141 and 1142 and in the enclosed hollow attachment 1170 is compressed due to the displacement of the diaphragm 1141 and the drive cone 1142 and the displacement of edges 1161*a* and 1162*a*, thereby exhibiting the spring property as the air spring. The voice coil bobbin 1145 can be controllably supported by the spring of the edges 1161*a* and 1162*a* and the air spring regulated by the volume of the enclosed space.

Here, as a difference in vibration area between the diaphragm 1141 and the drive cone 1142 becomes smaller and the volume of the enclosed space becomes larger, the air spring becomes smoother. In the sixth embodiment, when it is assumed that the difference between an effective area of the diaphragm 1141 and an effective area of the drive cone 1142 is $\Delta S$ and the total volume of the enclosed space including the volume of the enclosed hollow attachment 1170 is V, the hardness of the spring, that is, the stiffness of the spring constant indicating the spring property of the air spring, is proportional to $\Delta S/V$.

In the sixth embodiment, three enclosed hollow attachments 1170(1), 1170(2), and 1170(3) having different volumes belong to the speaker apparatus. By interchanging the enclosed hollow attachments 1170(1), 1170(2), and 1170(3), the total volume V of the enclosed space varies and the spring constant accordingly varies. Accordingly, a user can easily select a desired lowest resonant frequency $f_0$, only by interchanging the enclosed hollow attachment. By preparing a larger number of enclosed hollow attachments, a user can freely select the spring constant of the air spring from the state that the secondary air spring is not used (the fitting tag 1135*h* of the frame 1135 is opened by a closing attachment 1174 in FIG. 17) to the state that the air spring is used in maximum.

Figure 18:
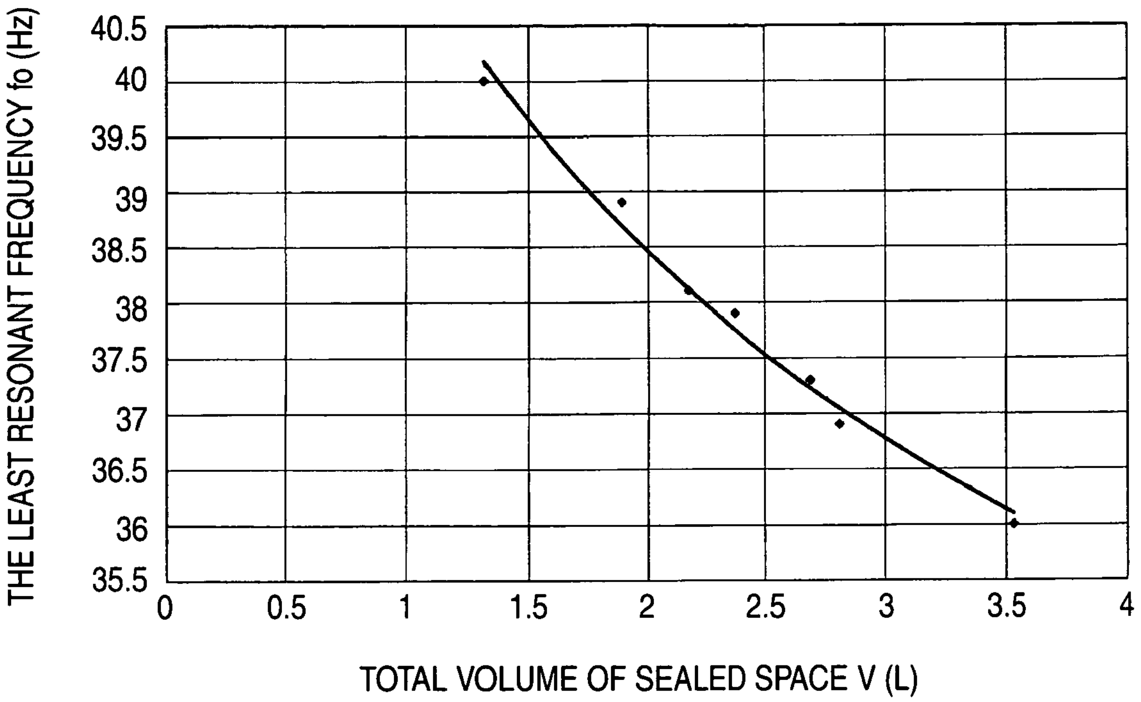
FIG. 18 is a graph illustrating a measurement result of the lowest resonant frequency $f_0$ while varying the total volume V of an enclosed space.

The measurement result of the lowest resonant frequency $f_0$ while varying the total volume V of the enclosed space by attaching the enclosed hollow attachments having different volumes is shown in the graph of FIG. 18.

In FIG. 18, it can be seen that as the total volume V of the enclosed space becomes greater, the lowest resonant frequency $f_0$ becomes smaller. That is, by fitting the enclosed hollow attachments 1170 having different volumes to the frame 1135, it is possible to adjust the lowest resonant frequency $f_0$.

In the speaker apparatus according to the sixth embodiment, the diaphragm 1141 and the drive cone 1142 also serve as a damper having a vibration control function, and the spring property as an air spring of the enclosed space 1167 between the diaphragms absorbs the vibration energy of the voice coil bobbin 1145, the diaphragm 1141, and the drive cone 1142 to control the voice coil bobbin 1145, the diaphragm 1141, and the drive cone 1142. Accordingly, it is not necessary to provide a control damper which was provided in the related-art speaker apparatus shown in FIG. 16. As a result, the axial size of the speaker apparatus is reduced due to omission of the damper and the installation space thereof, and it is thus possible to reduce the thickness of the speaker apparatus 1130, which is required for a car audio system or the like.

Since the drive cone 1142 disposed concentrically in back of the diaphragm 1141 so as to form the enclosed space 1167 between the diaphragms may be made of the same material as the diaphragm 1141 and the mechanical fatigue is less generated in comparison with the related-art bellows-shaped damper, it is possible to prevent deterioration in damping ability due to the mechanical fatigue of the constituent elements, thereby elongating the life time of the speaker apparatus.

Unlike the related-art bellows-shaped damper in which deformation is moved between the bellows adjacent to each other at the time of propagation of vibration, since large deformation is not locally generated in the diaphragm 1141 and the drive cone 1142, singular vibration or frictional sound making sound quality muddy does not occur. Accordingly, it is possible to reproduce sound with high quality without muddiness.

In the speaker apparatus 530 according to the sixth embodiment, the edge 561 of the diaphragm 541 and the edge 562 of the drive cone 542 become more resistant to deformation due to back pressure with help of the air pressure in the enclosed space 567 between the diaphragms. In addition, since the drive cone 542 and the edge 562 thereof take charge of the back pressure, the back pressure acting on the diaphragm 541 serving to reproduce sound is reduced, thereby improving the quality of reproduced sound.

As described above in detail, the frequency variable speaker apparatus 1130 according to the sixth embodiment of the present invention includes the diaphragm 1141 and the drive cone 1142 disposed in the driving direction, wherein the outer circumferences 1161 and 1162 of the diaphragm 1141 and the drive cone 1142 are fixed to the diaphragm supports 1135*c* and 1135*d* of the frame 1135, the inner circumferences 1141*a* and 1142*a* of the diaphragm 1141 and the drive cone 1142 are bonded to each other and then fixed to the voice coil bobbin 1145, the enclosed hollow attachment 1170 communicating with an enclosed space 1167 defined by the diaphragm 1141, the drive cone 1142, and the frame 1135 is detachably attached to the outer circumference of the frame 1135, and a spring constant of an air spring of the enclosed space is variable by replacing the enclosed hollow attachment 1170 with another enclosed hollow attachment having a different volume.

As a result, by preparing a plurality of enclosed hollow attachments having different volumes and interchanging the enclosed hollow attachments, the total volume V of the enclosed space including the main air spring space and the second air spring space varies and the spring constant accordingly varies. Accordingly, a user can easily select a desired lowest resonant frequency $f_0$, only by interchanging the enclosed hollow attachments. The enclosed hollow attachments having a variety of shapes may be prepared, and a user can freely select the lowest resonant frequency $f_0$. As a result, the user can adjust relative relations between desired sound quality and an enclosed hollow attachment to be attached.

Since the spring property as an air spring of the enclosed space 1167 between the diaphragm 1141 and the drive cone 1142 controls the voice coil bobbin 1145, the diaphragm 1141, and the drive cone 1142, it is not necessary to provide a specific damper for control. As a result, the axial size of the speaker apparatus is reduced due to omission of the damper and the installation space thereof, and it is thus possible to reduce the thickness of the speaker apparatus 1130, which is required for a car audio system or the like.

Since the drive cone 1142 can be made of the same material as the diaphragm 1141, the weight is smaller and the mechanical fatigue is less generated in comparison with the related-art bellows-shaped damper, it is possible to prevent deterioration in damping ability due to the mechanical fatigue of the constituent elements, thereby elongating the life time of the speaker apparatus. In addition, since large deformation is not locally generated in the diaphragm 1141 and the drive cone 1142, singular vibration or frictional sound making sound quality muddy does not occur. Accordingly, it is possible to reproduce sound with high quality without muddiness.

Hereinafter, a speaker apparatus according to a seventh embodiment of the present invention will be described in detail with reference to the drawings.

Figure 19:
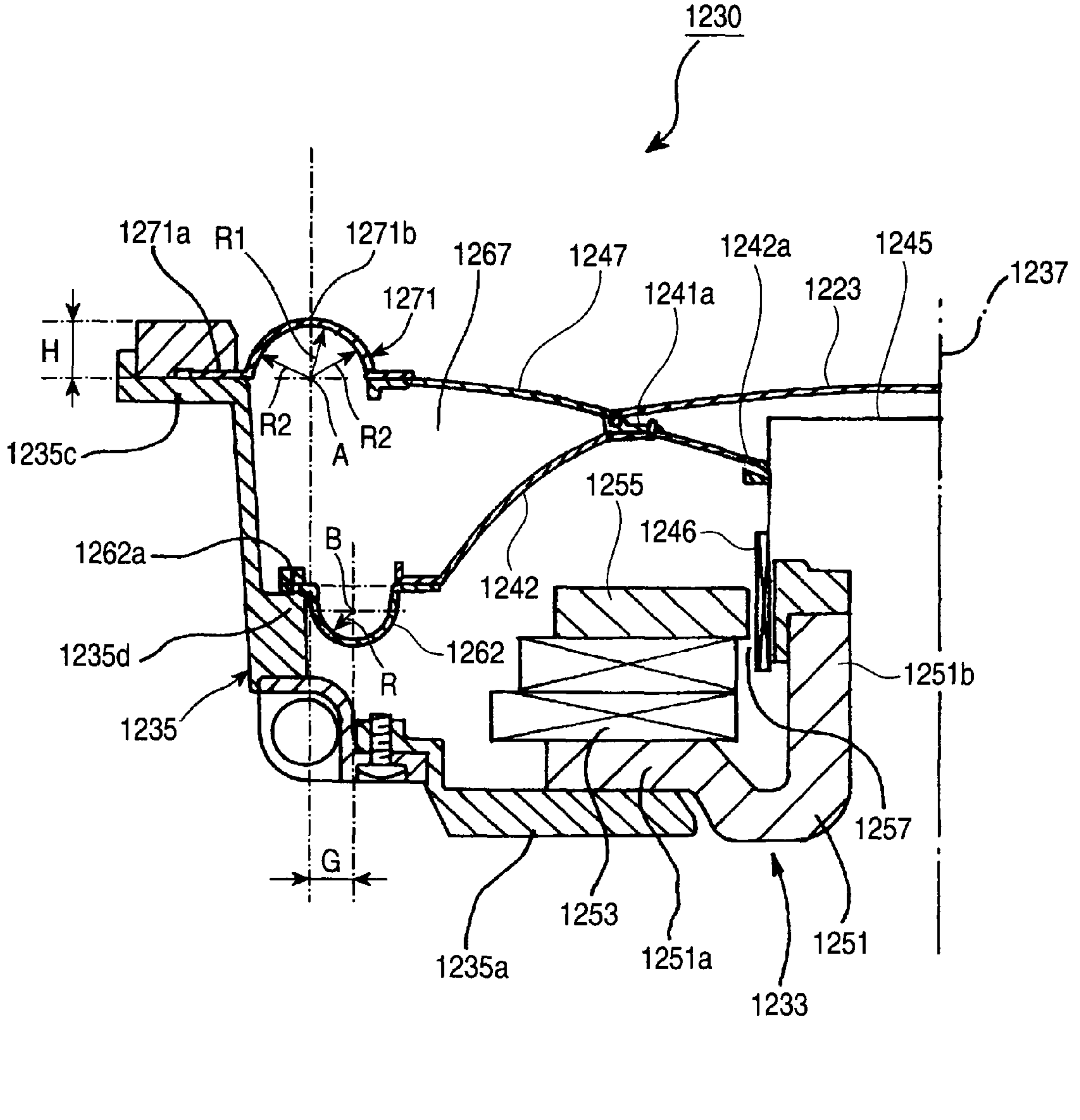
FIG. 19 is a longitudinal sectional diagram illustrating a half of a speaker apparatus according to a seventh embodiment.

FIG. 19 is a longitudinal sectional diagram illustrating a half of the speaker apparatus according to the seventh embodiment. As shown in FIG. 19, the speaker apparatus 1230 according to the seventh embodiment includes a magnetic circuit 1233, a frame 1235 in which the magnetic circuit 1233 is attached to the rear inner wall thereof, a diaphragm 1241 concentrically disposed in the driving direction, a drive cone 1242 delivering a drive power of a voice coil 1246 to the diaphragm 1241, and the voice coil 1246 wound on a cylindrical voice coil bobbin 1245. A vibration system is supported through the voice coil bobbin 1245 by an air spring in an enclosed space 1267 surrounded with the diaphragm 1241, the drive cone 1242, and the frame 1235. Reference numeral 1237 denotes a center line of the speaker apparatus 1230.

The magnetic circuit 1233 includes a yoke 1251 in which a cylindrical center pole 1251*b* is protruded from the center of a disk-shaped plate 1251*a*, a ring-shaped magnet 1253 which is movably inserted into the outer circumference of the center pole 1251*b*, and a ring-shaped top plate 1255 which is movably inserted into the front end of the center pole 1251*b* so that the magnet 1253 is inserted between the plate 1251*a* and the top plate 1255. The gap between the inner circumference of the top plate 1255 and the center pole 1251*b* serves as a magnetic gap 1257 in which the voice coil 1246 is disposed.

The frame 1235 has a shallow bawl shape and the magnetic circuit 1233 is attached to the inner surface of the bottom portion 1235*a* in a state that the plate 1251*a* of the yoke 1251 is placed thereon.

The frame 1235 is fitted with a diaphragm support 1235*c* for the diaphragm 1241 and a diaphragm support 1235*d* for the drive cone 1242, which are spaced apart from each other in the driving direction.

The diaphragm 1241 and the drive cone 1242 are cone-shaped diaphragms. An edge 1271 of the outer circumference of the diaphragm 1241 is a wide roll edge which bulges to the outside of the enclosed space 1267 between the diaphragms (to the front side of the speaker apparatus), and the edge 1262 of the outer circumference of the drive cone 1242 is a tall roll edge which bulges to the outside of the enclosed space 1267 between the diaphragms (to the rear side of the speaker apparatus). Attachment flange portions 1271*a* and 1262*a* extending from the outer ends of the edges 1271 and 1262 on the outer circumferences of the diaphragm 1241 and the drive cone 1242 are fixed to the diaphragm supports 1235*c* and 1235*d* of the frame 1235.

The diaphragm 1241 disposed on the front side of the speaker apparatus has a central opening with a diameter greater than that of the opening of the drive cone 1242, and the drive cone 1242 disposed in back of the diaphragm 1241 has a central opening with a diameter substantially equal to the outer diameter of the voice coil bobbin 1245.

The inner circumference 1241*a* of the diaphragm 1241 is attached to the drive cone 1242 in a state that it overlaps with the drive cone 1242 located in back thereof.

A dust cap 1223 is attached to the center of the diaphragm 1241. The dust cap 1223 covers the front side of the voice coil bobbin 1245 to prevent dust from invading the magnetic gap 1257.

By properly bonding and fixing the inner circumference 1242*a* of the drive cone 1242 to the outer circumference of the voice coil bobbin 1245 with an adhesive or the like, such a structure that the inner circumferences 1241*a* and 1242*a* of the diaphragm 1241 and the drive cone 1242 are bonded to each other and are fixed to the voice coil bobbin 1245 is obtained.

The cylindrical voice coil bobbin 1245 is inserted into the outer circumference of the center pole 1251*b* to be axially movable, and is positioned in the radius direction and the axial direction by the drive cone 1242 attached to the outer circumference thereof.

The edge 1271 of the diaphragm 1241 and the edge 1262 of the drive cone 1242 are preferably made of members of a material having low internal loss so as to damp the vibration delivered from a diaphragm as a diaphragm body. Accordingly, it is preferable that members of a material (material having internal loss greater than that of the diaphragm) different from the diaphragm are bonded to each other to form the edges 1261 and 1262.

Figure 20A:
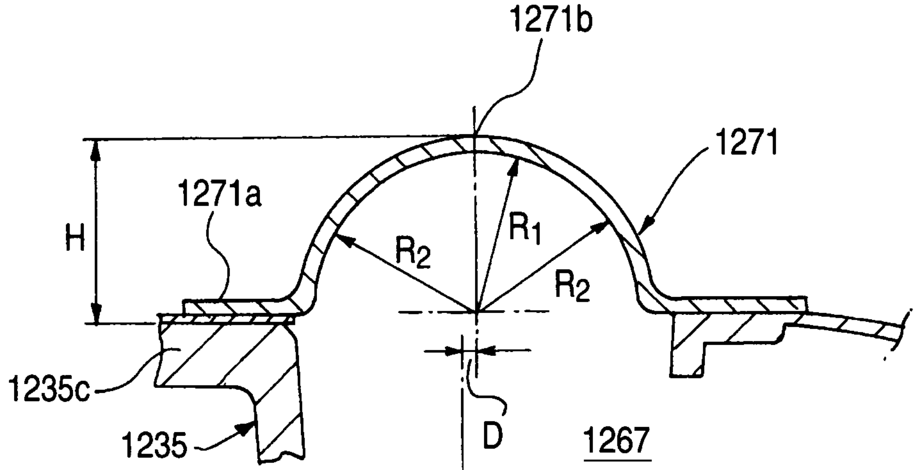
FIGS. 20A, 20B, and 20C are diagrams illustrating a variety of examples of a roll edge on the outer circumference of a diaphragm according to the seventh embodiment.
Figure 20B:
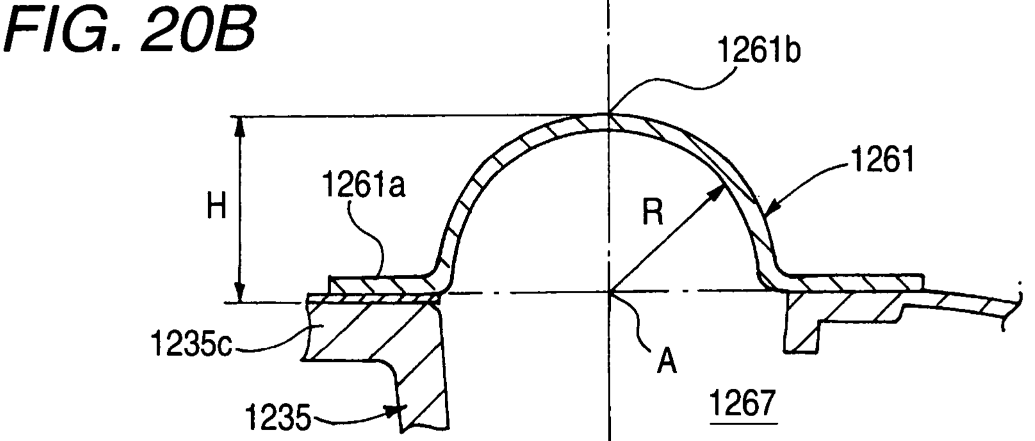
Figure 20C:
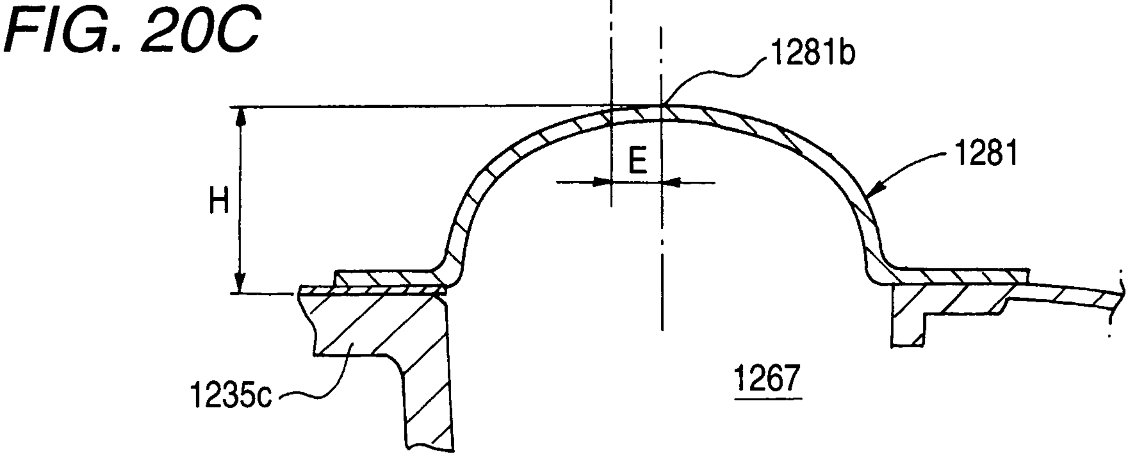

Here, examples of the shape of the roll edge formed on the outer circumference of the diaphragm will be described with reference to FIGS. 20A, 20B, and 20C. As shown in FIGS. 20A to 20C, the flange portion fixed to the diaphragm support 1235*a* of the frame 1235 is formed on the outer end of the roll edge. However, when the heights H (height from the diaphragm support 1235*c* of the frame to the roll vertexes 1271*b*, 1261*b*, and 1281*b*) of three roll edges are equal to each other, the roll edge shown in FIG. 20B is formed in a semi-circular shape with a single radius of curvature R about a point A in the same plane as the diaphragm support 1235*c*. This shape is referred to as a single R roll edge. On the contrary, in the roll edge 1271 shown in FIG. 20A, the position in the diaphragm diameter of the roll vertex 1271*b* is deviated toward the inner circumference from the roll vertex 1261*b* of the single R roll edge 1261 (distance D), and three circular arcs with three radii of curvature of the radius of curvature R1 of the vertex 1271*b* and two radii of curvature R2 on both sides thereof are tangent to each other, thereby forming a wide roll edge.

The roll edge 1281 shown in FIG. 20C is a wide roll edge in which the position of the vertex 1281*b* is more deviated toward the inner circumference of the diaphragm than that shown in FIG. 20A (distance E). Here, the roll edges shown in FIGS. 20A and 20C are referred to a wide roll edge, but the wide roll edge shown in FIG. 20A to which the circular arcs with the radii of curvature R2, R1, and R2 are tangent is employed in the seventh embodiment. The wide roll edge in the invention is not limited to the radii of curvature R2, R1, and R2, but a wide roll edge obtained by combining circular arcs with a plurality of radii of curvature may be employed.

In the wide roll edge 1271 according to the seventh embodiment, the volume of the enclosed space 1267 is larger than that of the single R roll edge 1261 shown in FIG. 20B, thereby smoothing the air spring. In the very wide roll edge 1281 shown in FIG. 20C, the volume of the enclosed space is further increased, thereby further smoothing the air spring. However, the edge strength is decreased, thereby causing suction of edge.

As shown in FIG. 19, the roll edge 1262 of the drive cone 1242 is a tall edge. The center B of the radius of curvature R of the roll is deviated toward the roll vertex from the plane of the flange portion 1262*a* on the outer end of the edge, the height of the edge is larger than those of the single R roll edge 1261 and the wide roll edges 1271 and 1281, and the volume of the enclosed space is increased as much.

Next, when the structure shown in FIG. 1B that the outer circumference of the diaphragm 1241 has the single R roll edge 1261 is compared in size with the structure that the outer circumference of the diaphragm has the wide roll edge 1271, the heights H of the roll edges 1261 and 1271 are equal to each other. When it is assumed that a gap between the center A of the roll edge 1261 shown in FIG. 1B and the center B of the roll edge 1262 is F and a gap between the center A of the roll edge 1271 shown in FIG. 19 and the center B of the roll edge (tall edge) 1262 of the drive cone 1242 is G, $F<G$ is obtained. Accordingly, the volume V of the enclosed space 1267 is larger in the seventh embodiment of FIG. 19 than that of FIG. 1B.

When the diaphragm 1241 and the drive cone 1242 are driven due to axial displacement of the voice coil bobbin 1245, the air such as air contained in the enclosed space 1267 between the diaphragm 1241 and the drive cone 1242 is compressed due to the displacement of the diaphragm 1241 and the drive cone 1242 and the displacement of the wide roll edge 1271 and the tall edge 1262, thereby exhibiting the spring property as the air spring. The voice coil bobbin 1245 can be controllably supported by the self springs of the edges 1261 and 1262 and the air spring regulated by the volume of the enclosed space 1267.

The diaphragm 1241 and the drive cone 1242 also serve as a damper having a vibration control function, and the spring property as an air spring of the enclosed space 1267 between the diaphragms absorbs the vibration energy of the voice coil bobbin 1245, the diaphragm 1241, and the drive cone 1242 to control the voice coil bobbin 1245, the diaphragm 1241, and the drive cone 1242. Accordingly, it is not necessary to provide a control damper which was provided in the related-art speaker apparatus. As a result, the axial size of the speaker apparatus is reduced due to omission of the damper and the installation space thereof, and it is thus possible to reduce the thickness of the speaker apparatus 1230, which is required for a car audio system or the like.

Since the drive cone 1242 disposed concentrically in back of the diaphragm 1241 so as to form the enclosed space 1267 between the diaphragms may be made of the same material as the diaphragm 1241 and the mechanical fatigue is less generated in comparison with the related-art bellows-shaped damper, it is possible to prevent deterioration in damping ability due to the mechanical fatigue of the constituent elements, thereby elongating the life time of the speaker apparatus.

Unlike the related-art bellows-shaped damper in which deformation is moved between the bellows adjacent to each other at the time of propagation of vibration, since large deformation is not locally generated in the diaphragm 1241 and the drive cone 1242, singular vibration or frictional sound making sound quality muddy does not occur. Accordingly, it is possible to reproduce sound with high quality without muddiness.

In the speaker apparatus 1230 according to the seventh embodiment, the edge 1261 of the diaphragm 1241 and the edge 1262 of the drive cone 1242 become more resistant to deformation due to back pressure with help of the air pressure in the enclosed space 1267 between the diaphragms. In addition, since the drive cone 1242 and the edge 1262 thereof take charge of the back pressure, the back pressure acting on the diaphragm 1241 serving to reproduce sound is reduced, thereby improving the quality of reproduced sound.

As described above in detail, the speaker apparatus 1230 according to the seventh embodiment includes the diaphragm 1241 disposed in the driving direction and the drive cone 1242 for delivering the drive power of the voice coil 1246 to the diaphragm 1241, wherein the outer circumferences of the diaphragm 1241 and the drive cone 1242 are fixed to the diaphragm supports 1235*c* and 1235*d* of the frame 1235, the space surrounded with the diaphragm 1241, the drive cone 1242, and the frame 1235 is the enclosed space 1267, and the vibration system is supported through the voice coil bobbin 1245 by a spring property of the air in the enclosed space 1267. Here, the roll edge 1271 constituting the outer circumference of the diaphragm 1241 is formed in a horizontally longitudinal shape with different radii of curvature and the roll edge 1262 constituting the outer circumference of the drive cone 1242 is formed in a tall edge shape in which the center of the radius of curvature is deviated toward the edge bulging side from the flange portion connected to the edge.

In the seventh embodiment, the wide roll edge in which the roll height of the outer edge of the diaphragm 1241 positioned at the front side of the speaker apparatus is suppressed and the circular arcs with a plurality of radii of curvature are connected to each other is employed. Since the effective vibration area of the diaphragm 1241 is associated with the center of the edge roll, the effective vibration area of the diaphragm 1241 can be smaller in the wide roll edge according to the seventh embodiment than in the single R roll edge with the same edge roll height. Accordingly, since the difference in effective vibration area $\Delta S$ ($=S1-S2$) between the diaphragm 1241 and the drive cone 1242 decreases, it is possible to smooth the air spring and to lower the lowest resonant frequency.

In comparison with the single R roll edge with the same roll height, since the volume of the enclosed space 1267 between the diaphragm 1241 and the drive cone 1242 increases by employing the wide roll edge according to the seventh embodiment, the air spring can be further smoothed. In the very wide roll edge 1281 shown in FIG. 20C, as described above, since the suction of edge can occur, proper balance is required.

When it is intended to harden the air spring, the difference in effective vibration area between the diaphragm 1241 and the drive cone 1242 should be increased. When the forward protruded length of the speaker apparatus is restricted, the single R roll edge is used as the roll edge of the diaphragm 1241 and the wide roll edge is used as the roll edge of the drive cone 1242. When the forward protruded length of the speaker apparatus is not restricted, the tall edge is used as the roll edge of the diaphragm 1241 and the single R roll edge is used as the roll edge of the drive cone 1242.

The drive cone 1242 is not limited to the shape described in the seventh embodiment, but may have any shape if only it can deliver the drive power of the voice coil 1246 to the diaphragm 1241.

What is claimed is:

1. A speaker apparatus comprising:

a magnetic circuit;

a diaphragm having an effective vibration area S1; and a drive cone having an effective vibration area S2, wherein outer circumferences of the diaphragm and the drive cone are fixed to supporting portions of a frame via a first edge and a second edge respectively;

a closed space defined by the diaphragm and the drive cone, the closed space has a volume V;

a spring constant of an air spring in the closed space is proportional to (S−S2)/V;

the magnetic circuit includes: a ring-shaped plate; and a ring-shaped magnet including a plurality of unit magnets each of which has a different outer diameter; and a curved surface of the drive cone is disposed parallel to a curved surface that is defined by corners of the plurality of unit magnets, the corners being closest corners to the drive cone.

2. The speaker apparatus according to claim 1, wherein: each of the unit magnets has a same thickness.

3. The speaker apparatus according to claim 1, wherein each of the plurality of unit magnets has one corner of the corners.

4. The speaker apparatus according to claim 1, wherein each of the plurality of unit magnets has two corners of the corners.

5. A speaker apparatus comprising:

a magnetic circuit;

a diaphragm having an effective vibration area S1; and a drive cone having an effective vibration area S2, wherein outer circumferences of the diaphragm and the drive cone are fixed to supporting portions of a frame via a first edge and a second edge respectively;

a closed space defined by the diaphragm and the drive cone, the closed space has a volume V;

a spring constant of an air spring in the closed space is proportional to (S1−S2)/V;

the magnetic circuit includes: a ring-shaped plate; and a ring-shaped magnet including a plurality of unit magnets each of which has a different outer diameter; and a curved surface of the drive cone is disposed parallel to a curved surface that is defined by corners of the plurality of unit magnets and corners of the ring-shaped plate, the corners being closest to the drive cone.

* * * * *